United States Patent

Nashiki et al.

[11] Patent Number: 5,256,951
[45] Date of Patent: Oct. 26, 1993

[54] NUMERICAL CONTROL APPARATUS HAVING FUNCTION FOR CHANGING CONTROL PARAMETERS

[75] Inventors: Masayuki Nashiki; Hisashi Kondo; Takeshi Hayakawa, all of Niwa, Japan

[73] Assignee: Okuma Corporation, Aichi, Japan

[21] Appl. No.: 916,251

[22] Filed: Jul. 21, 1992

[30] Foreign Application Priority Data

Jul. 22, 1991 [JP] Japan ............... 3-205427

[51] Int. Cl.⁵ .............................. G05B 19/33
[52] U.S. Cl. .............................. 318/575
[58] Field of Search ............... 318/560, 565, 568.22, 318/625, 569, 600, 575

[56] References Cited

U.S. PATENT DOCUMENTS

| | | | |
|---|---|---|---|
| 4,884,014 | 11/1989 | Itoh | 318/600 |
| 4,963,803 | 10/1990 | Kokura | 318/569 |
| 5,030,900 | 7/1991 | Kono et al. | 318/592 |
| 5,079,490 | 1/1992 | Kita et al. | 318/569 |
| 5,095,258 | 3/1992 | Drits et al. | 318/569 |

Primary Examiner—William M. Shoop, Jr.
Assistant Examiner—Karen Masih
Attorney, Agent, or Firm—Wenderoth, Lind & Ponack

[57] ABSTRACT

A numerical control apparatus for controlling feed shafts and a spindle of good machining and so on are possible because the control state is monitored at all times and provision is made for altering control parameters in accordance with the control state. The numerical control apparatus includes a detector for detecting the control state of the feed shafts and the spindle, a calculator for calculating control parameters based on the detected operating state of the feed shafts and the spindle, and a setter for setting the calculated control parameters, thereby changing the control parameters in response to the operating state of the feed shafts and the spindle.

4 Claims, 22 Drawing Sheets

NUMERICAL CONTROL APPARATUS HAVING FUNCTION FOR CHANGING CONTROL PARAMETERS

BACKGROUND OF THE INVENTION

1. Field of the Invention

The present invention relates to a numerical control apparatus capable of altering control parameters, which the apparatus, by appropriately altering the parameters used for control of feed shafts and a spindle of a machine tool, can provide optimum control at all times.

2. Description of the Related Art

FIG. 1 is a block diagram of an embodiment of a known numerical control apparatus for a machine tool. An actuating command means 1 calculates actuating commands MX, MY and MM for feed shafts (X-axis and Y-axis) and a spindle, respectively, and sends the commands to motor control means 2X, 2Y and 2M respectively. Since all of the axes are controlled in essentially the same fashion, only the case of the X-axis will be explained. The actuating command means 1 calculates the actuating command MX for the X-axis and sends it to the X-axis motor control means 2X, which receives it and then calculates current command SIX, which it sends to an X-axis current control means 3X. Based on the current command SIX, the X-axis current control means 3X generates an output current IX and drives an X-axis motor 4X. An X-axis position detector 5X, which is mechanically connected to the X-axis motor 4X, detects the position of the X-axis motor 4X and sends position detection value PX to the X-axis motor control means 2X. Next, the X-axis motor control means 2X, using the position detection value PX, controls the position of the X-axis motor 4X. The X-axis motor 4 is coupled to a table, a slide, etc. of the machine tool via a ball screw and so on and drives them, but these are not shown in FIG. 1. Control parameters such as a gain of a position loop, a proportional gain and an integral gain of a speed loop, an acceleration/deceleration time constant; and a cut-off frequency of a speed detection filter are set in the X-axis motor control means 2X and/or the X axis current control means 3X and prescribe the operation thereof.

Since the control state of the feed shafts and/or the spindle of the machine tool or the like is always varying, the optimum control parameters are also always varying. For example, since the acceleration/deceleration time constants of the feed shafts are limited by the weight of the work to be machined which is loaded on the table, if the weight changes the limitation on the acceleration/deceleration time constant also changes. Further, since the weight of the work to be machined varies during the machining, it is necessary to change the acceleration/deceleration time constants. Also, other control parameters may vary as a result of change in the weight of the work. For example, the whole weight of the table changes due to the weight changing of the work, and therefore the natural vibration frequency of the table as a whole changes. Since vibration may be generated in the table during the machining if the natural vibration frequency varies, there is a problem of degree of machining precision. In this case, it is necessary to change the control parameters such as the gain of the speed loop and the cut-off frequency of the speed detection filter in order to restrain the vibration. In addition, the machining state and environment have a great effect on control performance, i.e. on the machining precision and efficiency. In known numerical control apparatus, there is a problem of lowering of the machining precision and efficiency, because an appropriate control state cannot be maintained and therefore the control parameters which are appropriate in relation to changes in the machining state and environment and balanced for each axis cannot be maintained.

SUMMARY OF THE INVENTION

The present invention arose from the situation explained above, and its aim is to offer a numerical control apparatus capable of changing control parameters to optimal control parameters even when the machining state and/or environment change.

The present invention relates to a numerical control apparatus capable of changing control parameters, which apparatus, by appropriately changing the parameters used for control feed shafts and spindle of a machine tool, can provide an optimum control at all times. To this end, the present invention provides a numerical control apparatus comprising: a detecting means for detecting the control state of the feed shafts and the spindle; a calculating means for calculating control parameters based on the detected operating state of the feed shafts and the spindle; and setting means for setting the calculated control parameters, thereby changing the control parameters in response to the operating state of the feed shafts and the spindle.

The nature, principle and utility of the invention will become more apparent from the following detailed description when read in conjunction with the accompanying drawings.

DESCRIPTION OF THE PREFERRED EMBODIMENTS

Figure 1:
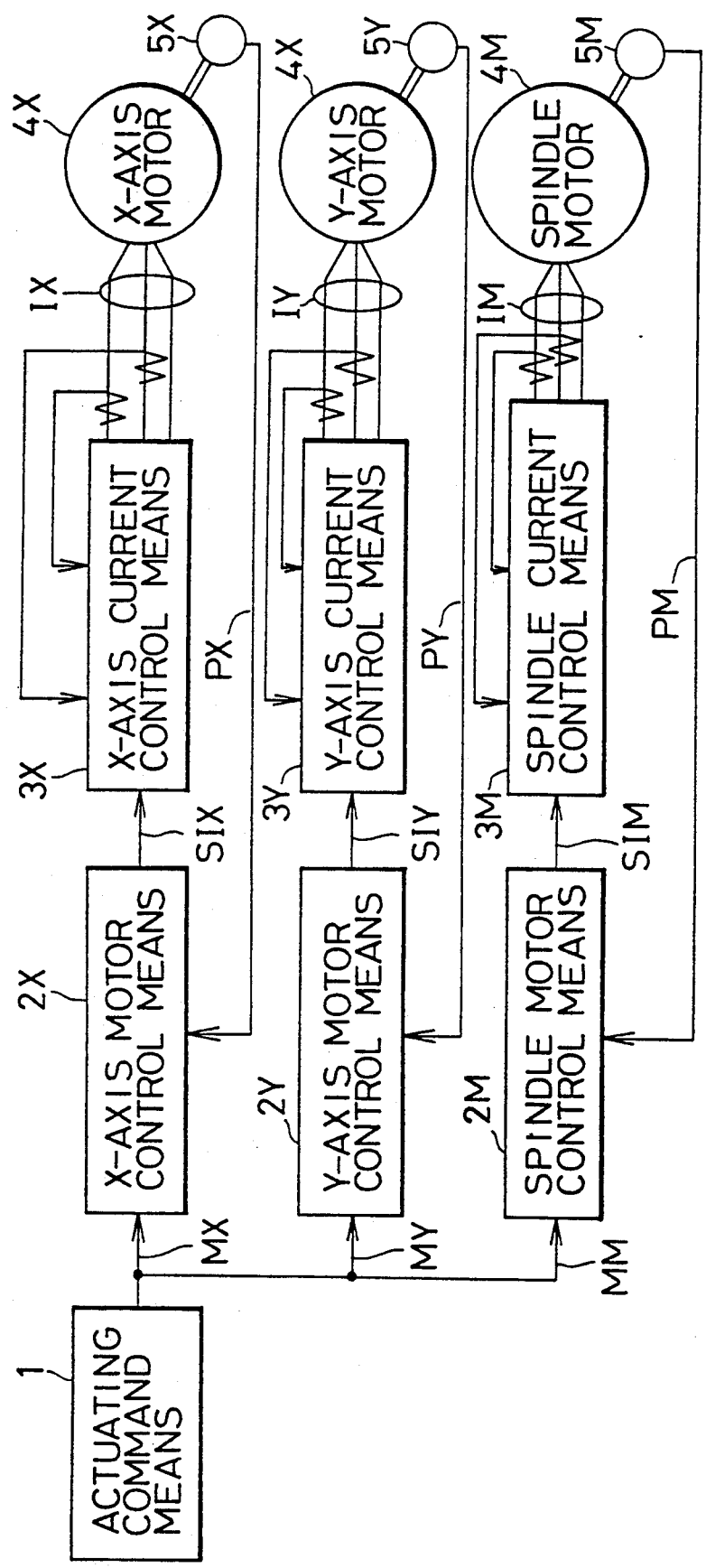
FIG. 1 is a block diagram of an embodiment of a known numerical control device.
Figure 2:
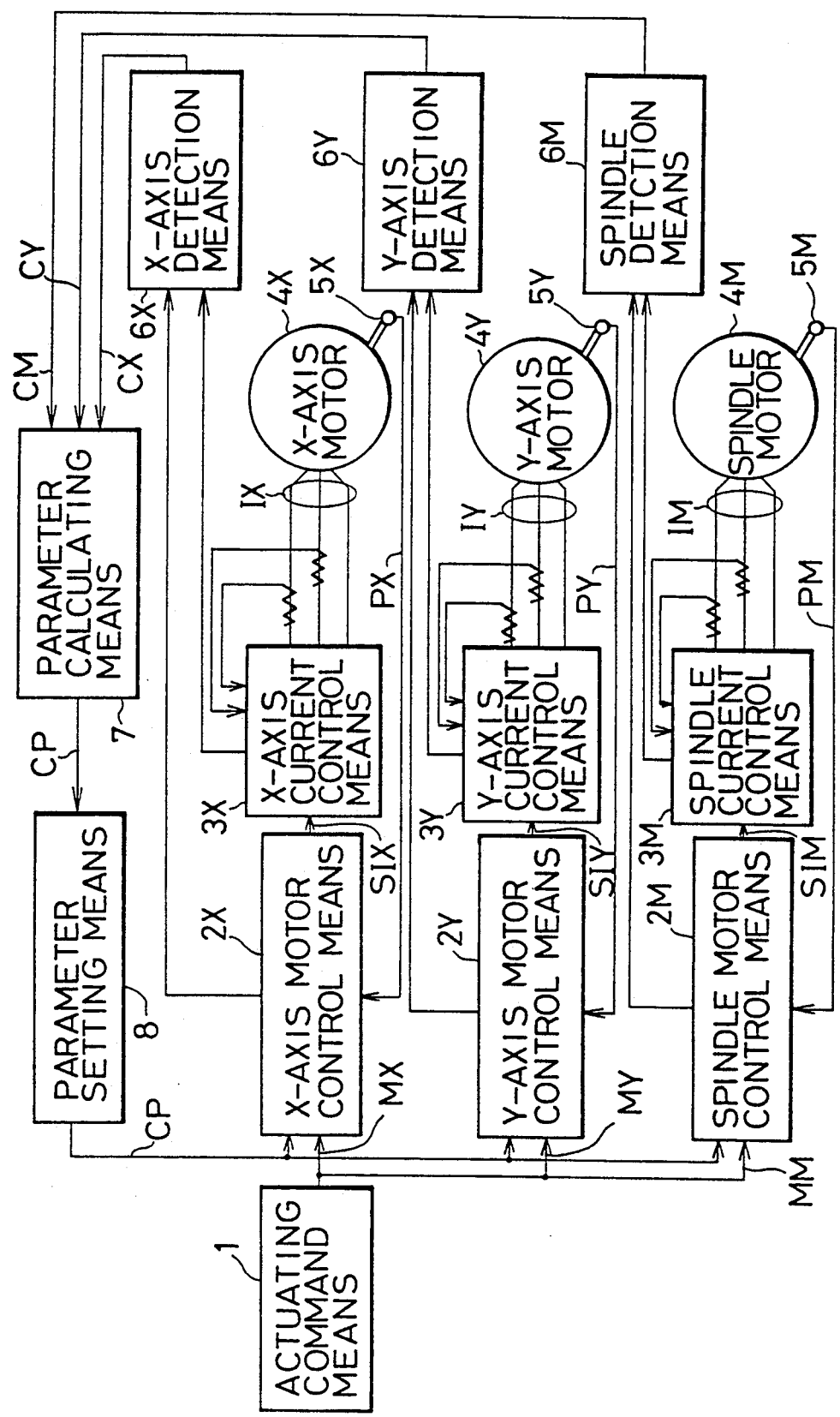
FIG. 2 is a block diagram of a first embodiment of a numerical control apparatus of the present invention having a function for changing control parameters.

FIG. 2 is a block diagram showing a first embodiment of a numerical control apparatus of the present invention having a function for changing a control parameters and is to be compared to the prior art shown in FIG. 1. The same reference numerals are used for elements common to both figures and no further explanation thereof is provided. An X-axis detection means 6X reads in each kind of command value from the X-axis motor control means 2X and the X-axis current control means 3X, and then detects the control state control and the environment. Next, a parameter calculating means 7 reads in the X-axis control state data CX detected by the X-axis detection means 6X, and also the detected control state data CY and CM of the other two axes, and then calculates the optimum control parameters CP, and sends the control parameters CP to a parameter setting means 8. The parameter setting means 8 respectively sets the inputted control parameters CP in axis motor control means 2X, 2Y and 2M. As a result each of axis motor control means 2X, 2Y and 2M act according to the control parameters CP which have been set, and therefore a good control state can be maintained at all times.

The actuating command means 1 and/or any or all of axis motor control means 2X, 2Y and 2M may be constructed based on software of the computer. Also, it is possible to have a software response by putting the data established beforehand by experiment as being the optimum control parameters into the form of variables or tables, as a method for calculating the control parameters CP in the parameter calculating means 7.

Figure 3:
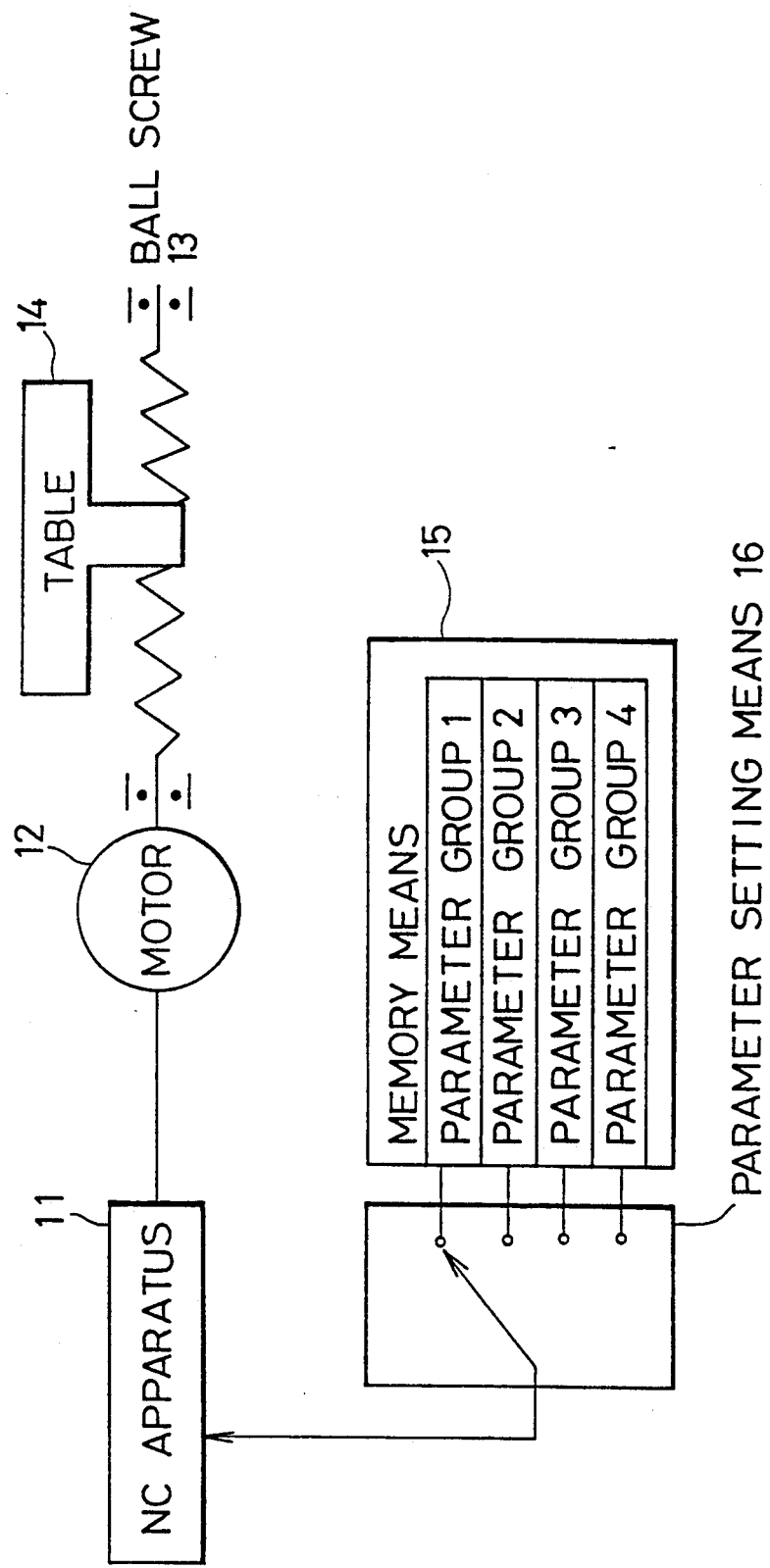
FIG. 3 is a block diagram of a second embodiment of a numerical control apparatus of the present invention having a function for changing control parameters.

FIG. 3 is a block diagram of a second embodiment of a numerical control apparatus of the present invention having a function for changing the control parameters. The numerical control apparatus 11 drives a motor 12 to control the position of the work to be machined, which is fixed to a table 14, which is coupled via a ball screw 13. First, four different weight cases are hypothesized for the portion to be machined away, for example 10%, 30%, 60% and 90% of the maximum removable weight. Next, for each of those cases the total inertia of the motor 12, the ball screw 13 and the table 14 is calculated. According to the total inertia and the output torque characteristics of the motor 12, the shortest acceleration/deceleration time constant and other parameters are calculated beforehand, and stored in a memory means 15. Next, the group of parameters suited to the actual work to be machined is set in the numerical control apparatus 11 by a parameter setting means 16, to optimize acceleration/deceleration time constants and so on, and thus a reduction in machining time can be expected.

Figure 4:
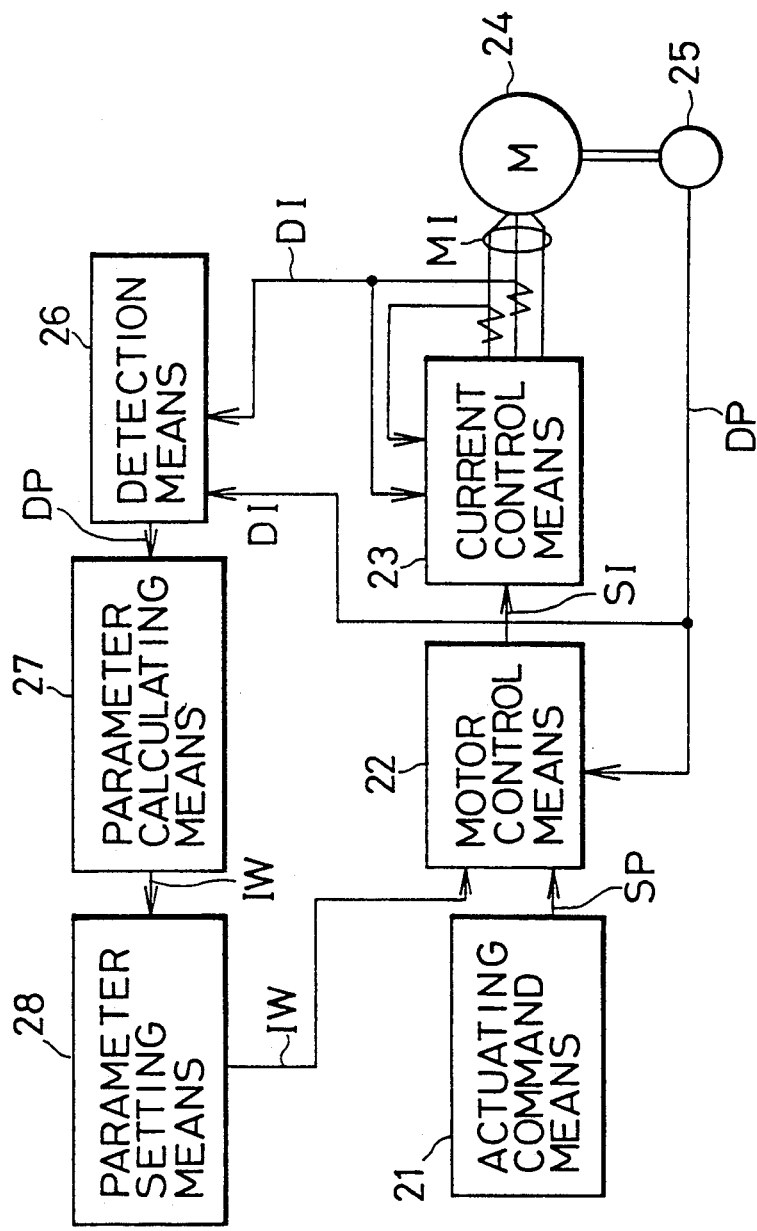
FIG. 4 is a block diagram of a third embodiment of a numerical control apparatus of the present invention having a function for changing control parameters.

FIG. 4 is a block diagram of a third embodiment of a numerical control apparatus of the present invention having a function for changing the control parameters. An actuating command means 21 sends a position command SP to a motor control means 22. Meanwhile, a position detector 25, which is mechanically connected to a motor 24, detects the position of the motor 24 and sends the detected position value to the motor control means 22. The motor control means 22 inputs the position command SP and detected position value DP, performs the calculation on them, calculates a current command SI and sends it to a current control means 23. Based on the current command SI the current control means 23 generates a motor drive current MI and drives the motor 24. At this point, a detection means 26 detects a position detection value DP and a current detection value DI, whereupon the parameter calculating means 27 utilizes the position detection value DP and the current detection value DI to calculate a load inertia Iw, and sets the load inertia Iw in the parameter setting means 28. For example, the motor speed is calculated by differentiating the position detection value DP, the acceleration Am of the motor is calculated by differentiating the motor speed, and further the torque T at that point in time is also calculated from the current detection value DI. Since the inertia of the rotor is fixed, if the inertia is expressed by a numeral "Im", then the load inertia Iw is approximated by the equation (1) below.

$$Iw = T/Am - Im \qquad (1)$$

Since the motor's maximum output torque TM is given, if the maximum speed used for the motor 24 is expressed by a numeral "S", the shortest acceleration/deceleration time Ta can be determined by using equation (2) below.

$$Ta = S \times (Im + Iw)/TM \qquad (2)$$

The parameter setting means 28 sends the shortest acceleration/deceleration time Ta to the motor control means 22, and as a result acceleration/deceleration constants are optimized, and a reduction in the machining time can be expected.

Figure 5:
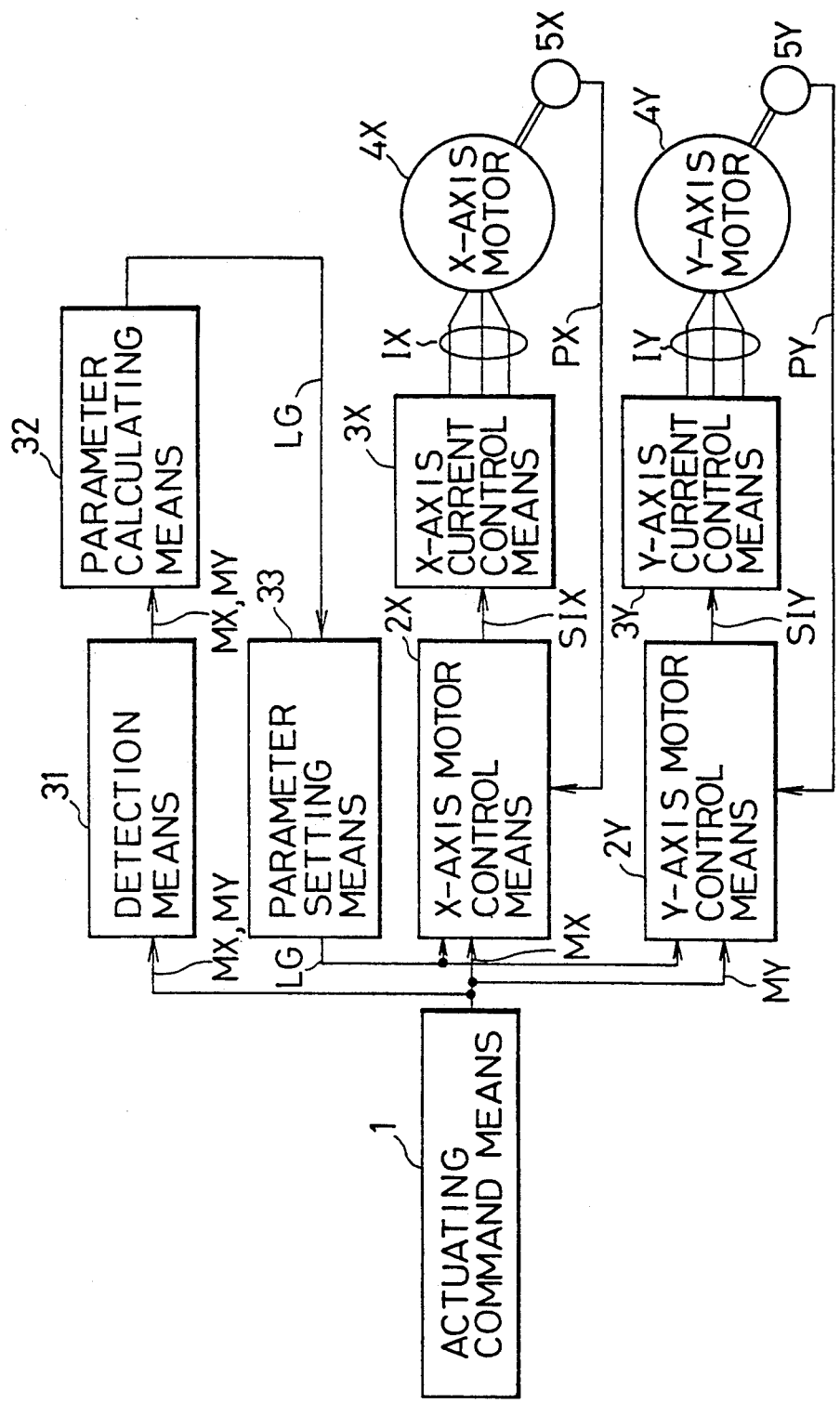
FIG. 5 is a block diagram of a fourth embodiment of a numerical control apparatus of the present invention having a function for changing control parameters.

FIG. 5 is a block diagram of a fourth embodiment of a numerical control apparatus of the present invention having a function for changing the control parameters, and may be compared with the similar FIG. 2. The same reference numerals are used for elements common to both figures and no further explanation is given. FIG. 5 shows a numerical control apparatus which operates the synchronous driving of two axes, and a detection means 31 detects actuating commands MX and MY for the X- and Y-axes. A parameter calculating means 32 then compares the speeds of the two axes' actuating commands MX and MY. If a difference in their speeds occurs, the loop gain LG of position and speed is calculated in accordance with the respective speeds and the difference therebetween and the loop gain LG is sent to a parameter setting means 33. The parameter setting means 33 sets the calculated loop gains LG of the position and speed for the respective axes. As a result, production of a shape error which is caused by the difference in delay of a response when, in the cutting of corner portions etc., there is a large difference in the feed speed of the two axes X and Y, can be reduced.

Figure 6:
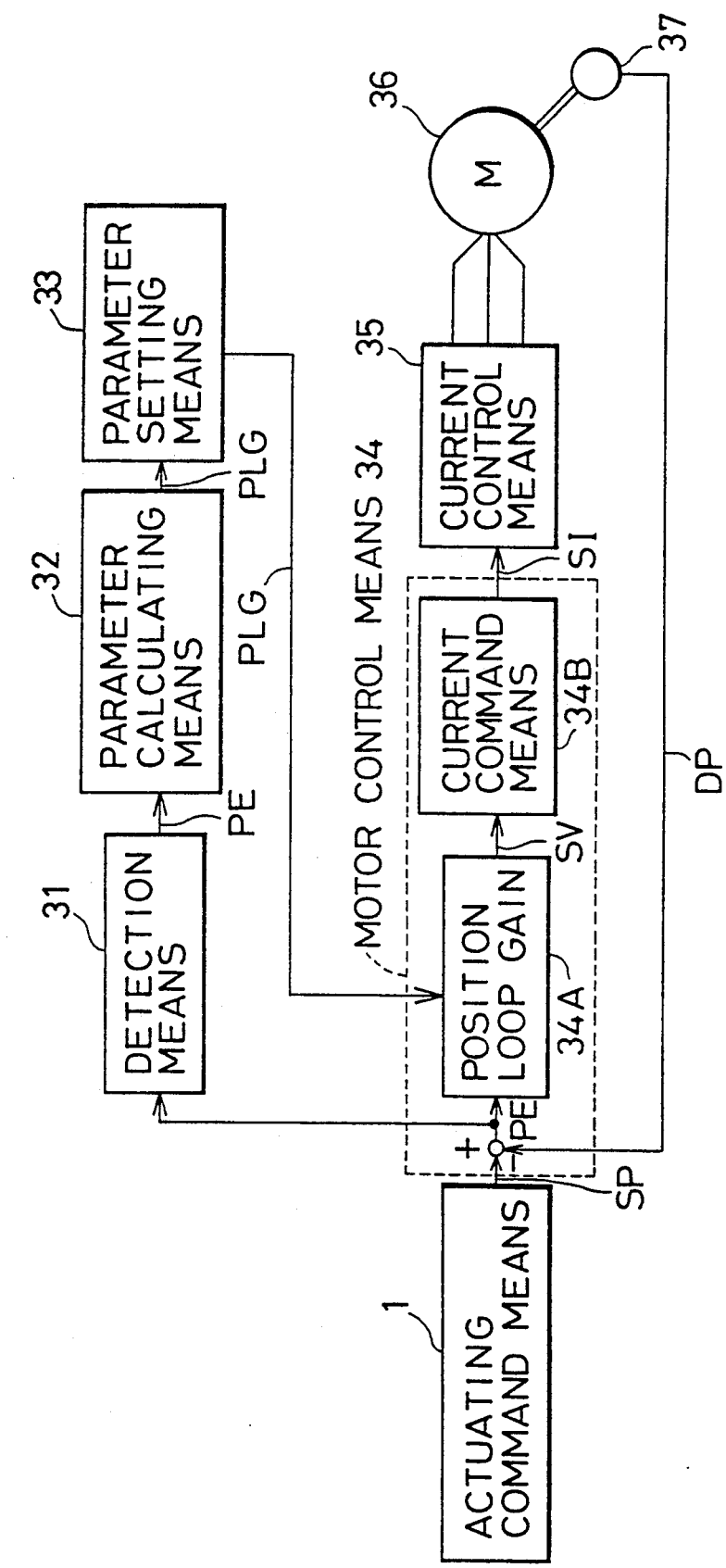
FIG. 6 is a block diagram of a fifth embodiment of a numerical control apparatus of the present invention having a function for changing control parameters.

FIG. 6 is a block diagram of a fifth embodiment of a numerical control apparatus of the present invention having a function for changing the control parameters. The actuating command means 1 sends a position command SP to a motor control means 34. Also, a position detector 37 connected to a motor 36 detects the position of motor 36 and sends the position detection value DP to the motor control means 34. The motor control means 32 calculates a position error PE from the position command SP and the position detection value DP, and calculates a speed command SV by multiplying a position error PE by a position loop gain PLG, and, on the basis of the speed command SV, calculates a current command SI and sends it to a current control means 35. The command current control means 35 generates the drive currents in accordance with the current command SI and drives the motor 36, whereupon the detection means 31 detects a position error PE. Next, the parameter calculating means 32 calculates the position loop gain PLG based on the position error PE. For example, it makes the position loop gain PLG large only when the position error PE is large. For example, if a position error amount is expressed by "e" and the position loop gain by "Kp", the position loop gain Kp is calculated as follows:

$$Kp = k0 + k1 \times |e| \qquad (3)$$

Figure 7:
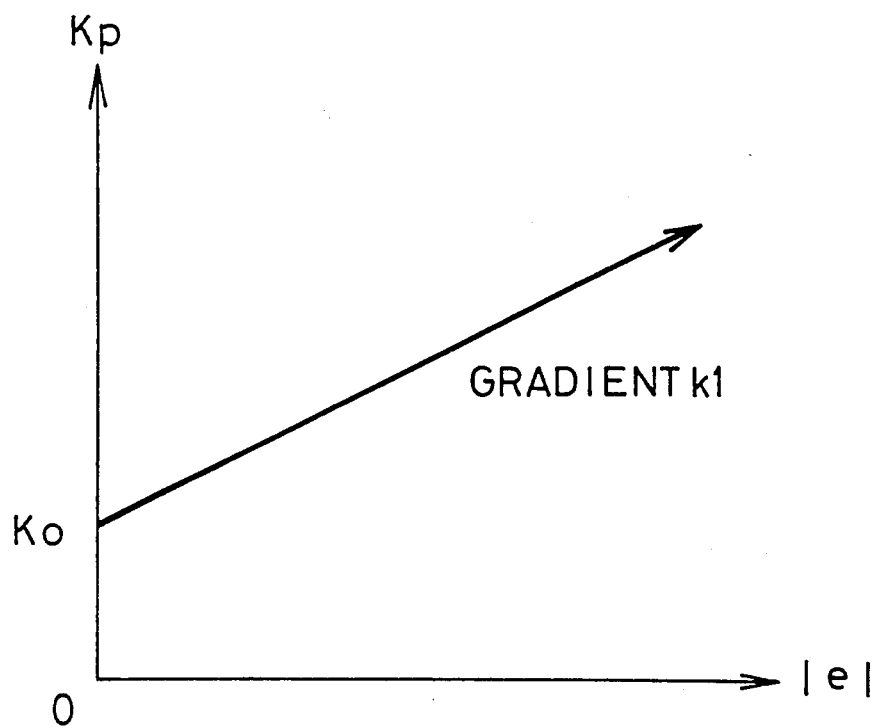
FIG. 7 is a graph showing the relationship between the amount of position error and a position loop gain for an apparatus of the present invention shown in FIG. 6.
Figure 8:
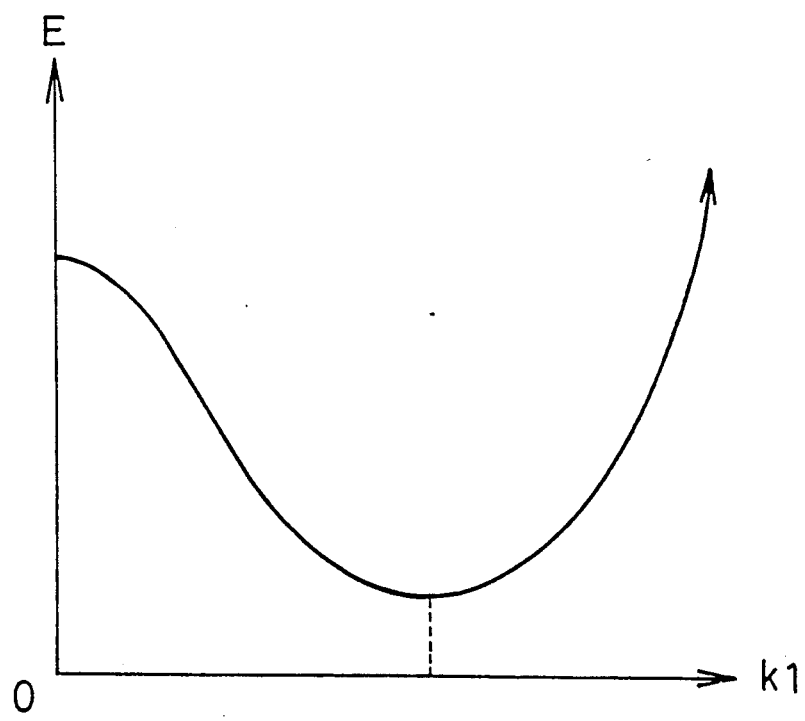
FIG. 8 is a graph showing the relationship between the gradient k1 and the running average E for the apparatus of the present invention.

This relationship is shown in FIG. 7. A value of "k0" being given, a running average E of the position error amount |e| is calculated, and a gradient k1 is determined so as to minimize the running average E. In general, as shown in FIG. 8, since there is a valley bottom point, the gradient k1 is determined so as to minimize the bottom point. The parameter setting means 33 sets the thus calculated position loop gain Kp in the motor control means 34. As a result, the follow-up delay in the transient time is reduced, and a stable operation in a stationary state can be achieved.

Figure 9:
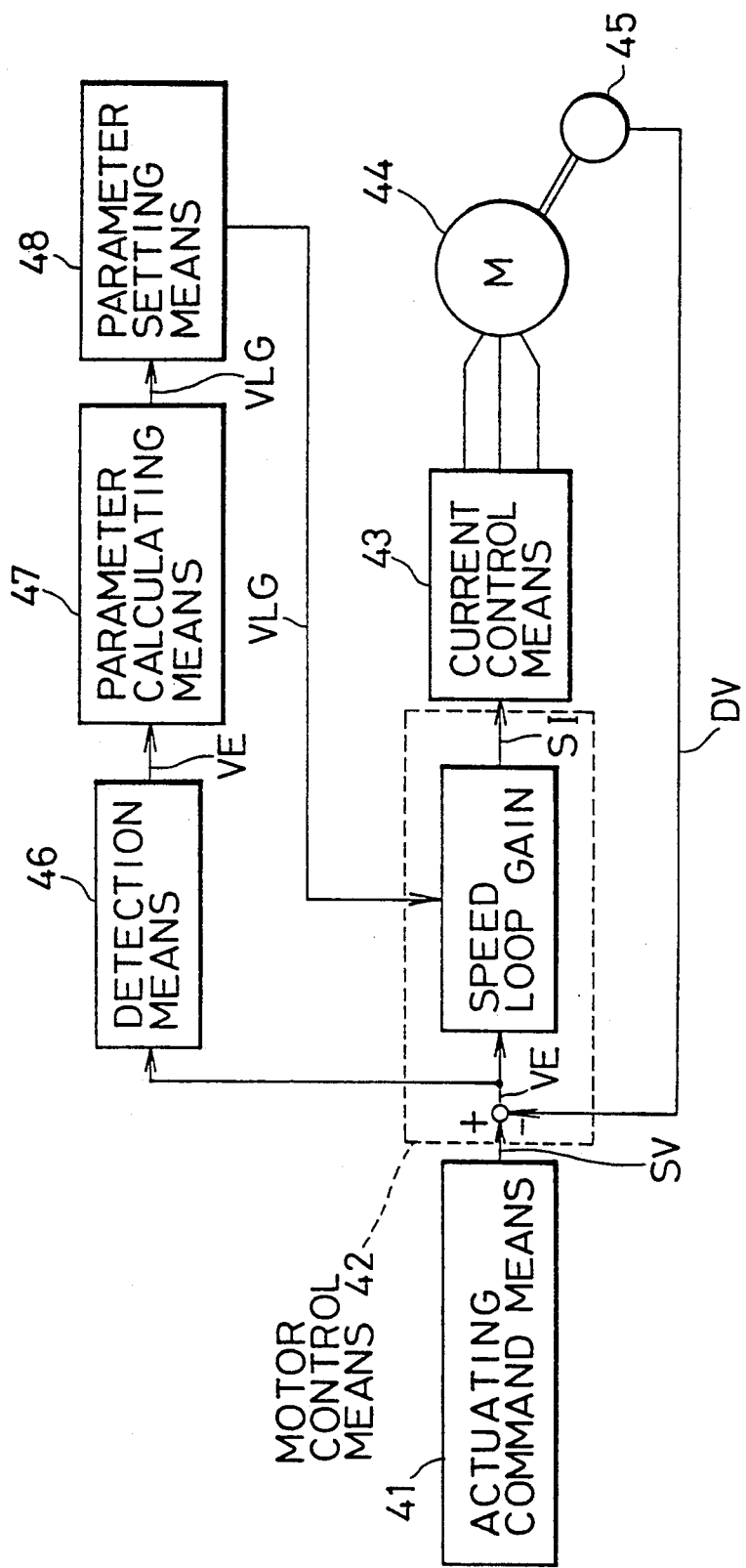
FIG. 9 is a block diagram of a sixth embodiment of a numerical control apparatus of the present invention having a function for changing control parameters.

FIG. 9 is a block diagram of a sixth embodiment of a numerical control apparatus of the present invention having a function for changing the control parameters.

An actuating command means 41 sends a speed command SV to a motor control means 42. A speed detector 45, which is mechanically connected to a motor 44, detects the speed of the motor 44 and sends the speed detection value DV to the motor control means 42. Based on the speed command SV and the speed detection value DV, the motor control means 42 calculates a speed error VE, and from the speed error VE and a speed loop gain VLG calculates a current command SI and sends it to a current control means 43. Based on the current command SI, the current control 43 generates current and drives the motor 44, whereupon a detection means 46 detects the speed error VE. Next, a parameter calculating means 47 calculates the speed loop gain VLG based on the speed error VE. For example, it makes the speed loop gain VLG large only when the speed error VE is large. A parameter setting means 48 sets the speed loop gain VLG in the motor control means 42. As a result, a response delay in the transient time is reduced, and a stable operation can be achieved in a stationary state.

Figure 10:
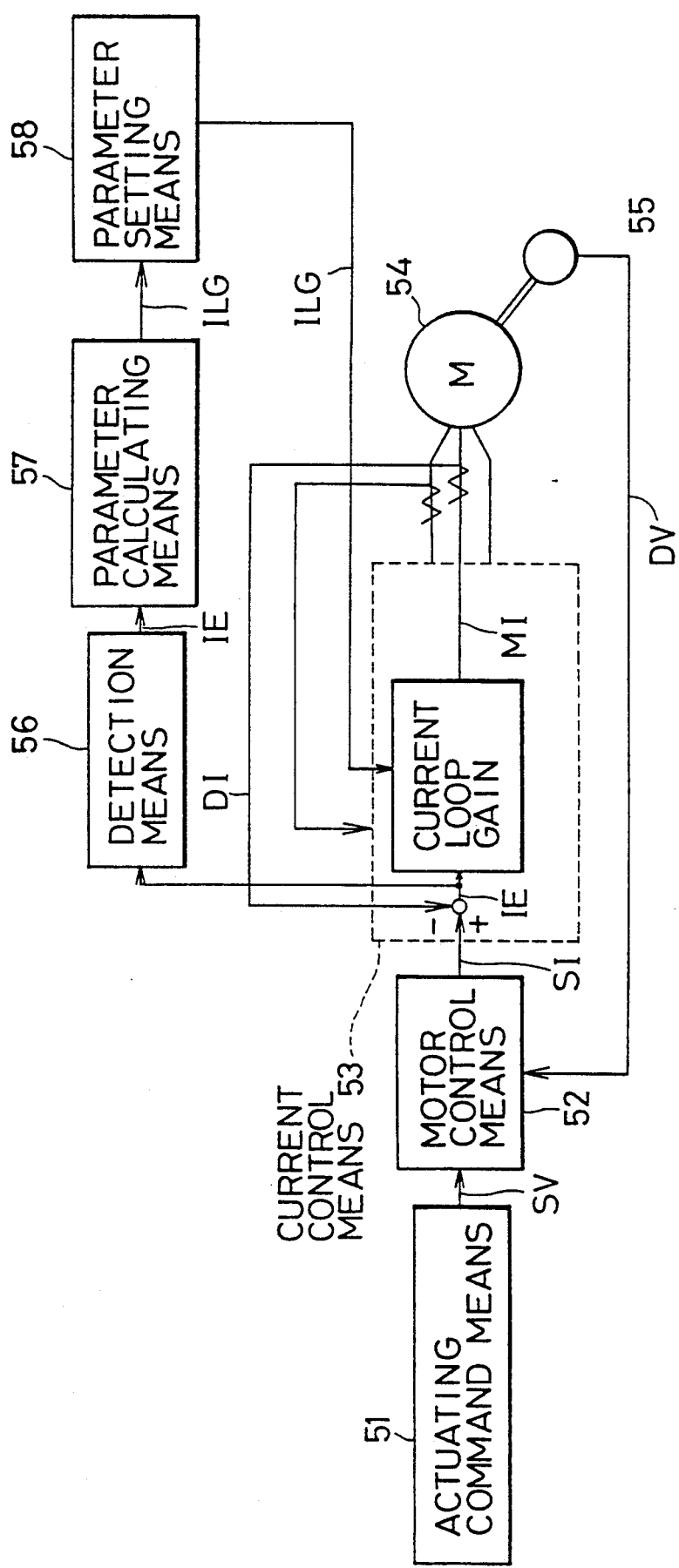
FIG. 10 is a block diagram of a seventh embodiment of a numerical control apparatus of the present invention having a function for changing the control parameters.

FIG. 10 is a block diagram of a seventh embodiment of a numerical control apparatus of the present invention having a function for changing the control parameters. An actuating command means 51 sends a speed command SV to a motor control means 52. A speed detector 55, which is mechanically connected to a motor 54, detects the speed of the motor 54 and sends the speed detection value DV to the motor control means 52. From the speed command SV and the speed detection value DV, the motor control means 52 calculates a speed error, and, based on that, calculates a current command SI and sends it to a current control means 53. From the current command SI and the current detection value DI, the current control means 53 calculates a current error IE, and, using the current error IE and a current loop gain ILG, calculates a drive current MI and drives the motor 54. This operation is done in each phase, but the figure shows the arrangement for one phase only. A detection means 56 now detects a current error IE. Next, based on the current error IE, a parameter calculating means 57 calculates the current loop gain ILG. For example, it makes the current loop gain ILG large only when the current error IE is large. A parameter setting means 58 sets the current loop gain ILG in the current control means 53. As a result, speed response characteristic in the transient time is improved, and a stable operation can be achieved in a stationary state.

Figure 11:
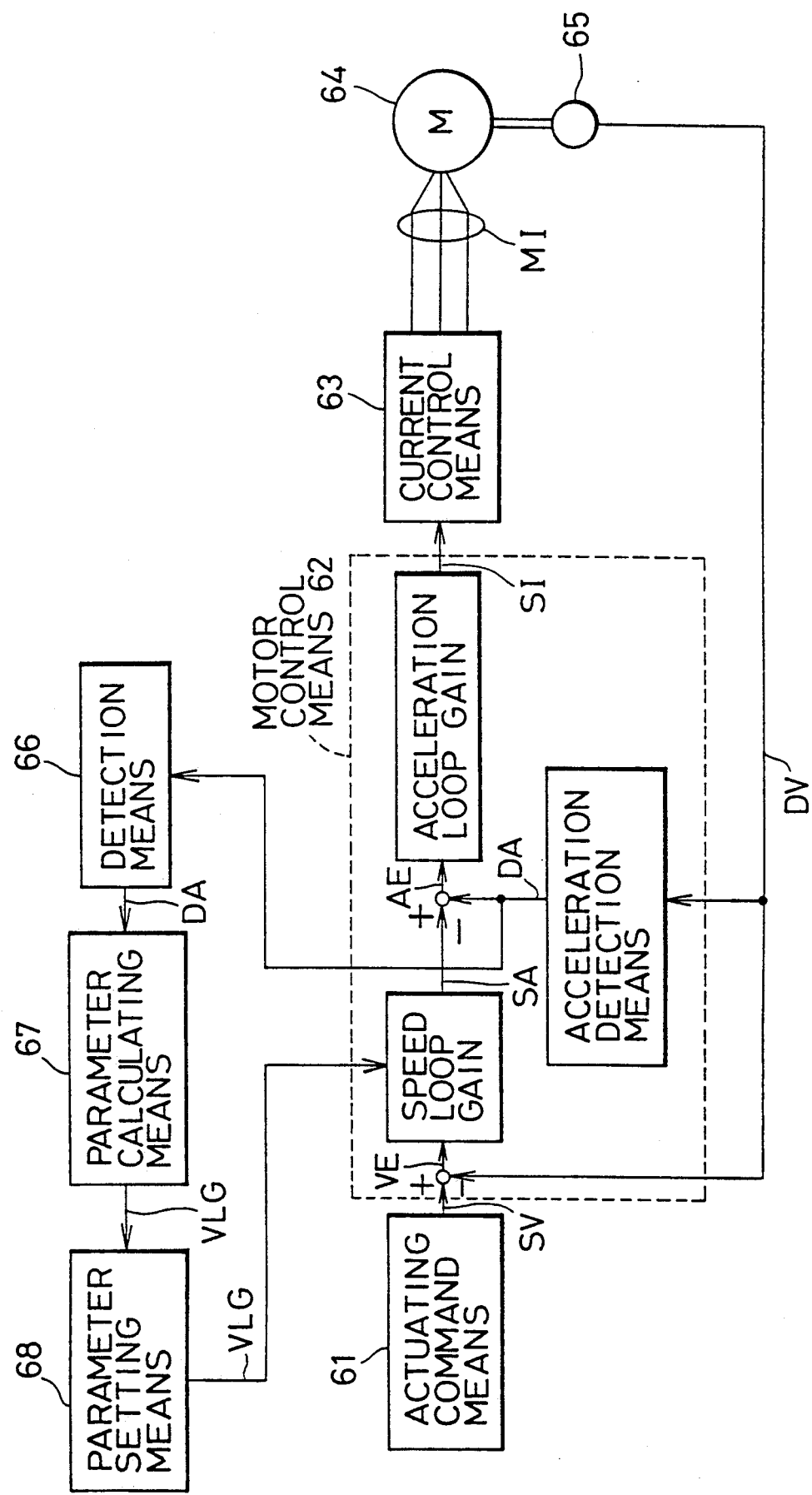
FIG. 11 is a block diagram of an eighth embodiment of a numerical control apparatus of the present invention having a function for changing the control parameters.

FIG. 11 is a block diagram of an eighth embodiment of a numerical control apparatus of the present invention having a function for changing the control parameters. An actuating command means 61 sends a speed command SV to a motor control means 62. A speed detector 65, which is mechanically connected to a motor 64, detects the speed of the motor 64 and sends the speed detection value DV to the motor control means 62. From the speed command SV and the speed detection value DV, the motor control means 62 calculates a speed error VE, and, using the speed error VE and a speed loop gain VLG, calculates an acceleration command SA, and, from a detection acceleration DA, obtained by differentiating the acceleration command SA and the speed detection value DV, calculates an acceleration error AE. The motor control means 62 calculates a current command SI based on the acceleration error AE and sends the current command SI to the current control means 63. Based on the current command SI, the current control means 63 calculates a drive current MI and drives the motor 64, whereupon a detection means 66 detects the detection acceleration DA. Then, based on the detection acceleration DA, a parameter calculating means 67 calculates the speed loop gain VLG. For example, it makes the speed loop gain VLG small when the detection acceleration DA is small. As a result, the response speed is lowered but the stability increases and the smoothness of the machined surface is improved. A parameter setting means 68 sets the speed loop gain VLG in the motor control means 62. As a result, a control state with a reduced delay of the response in the transient time can be obtained in a stationary state.

Figure 12:
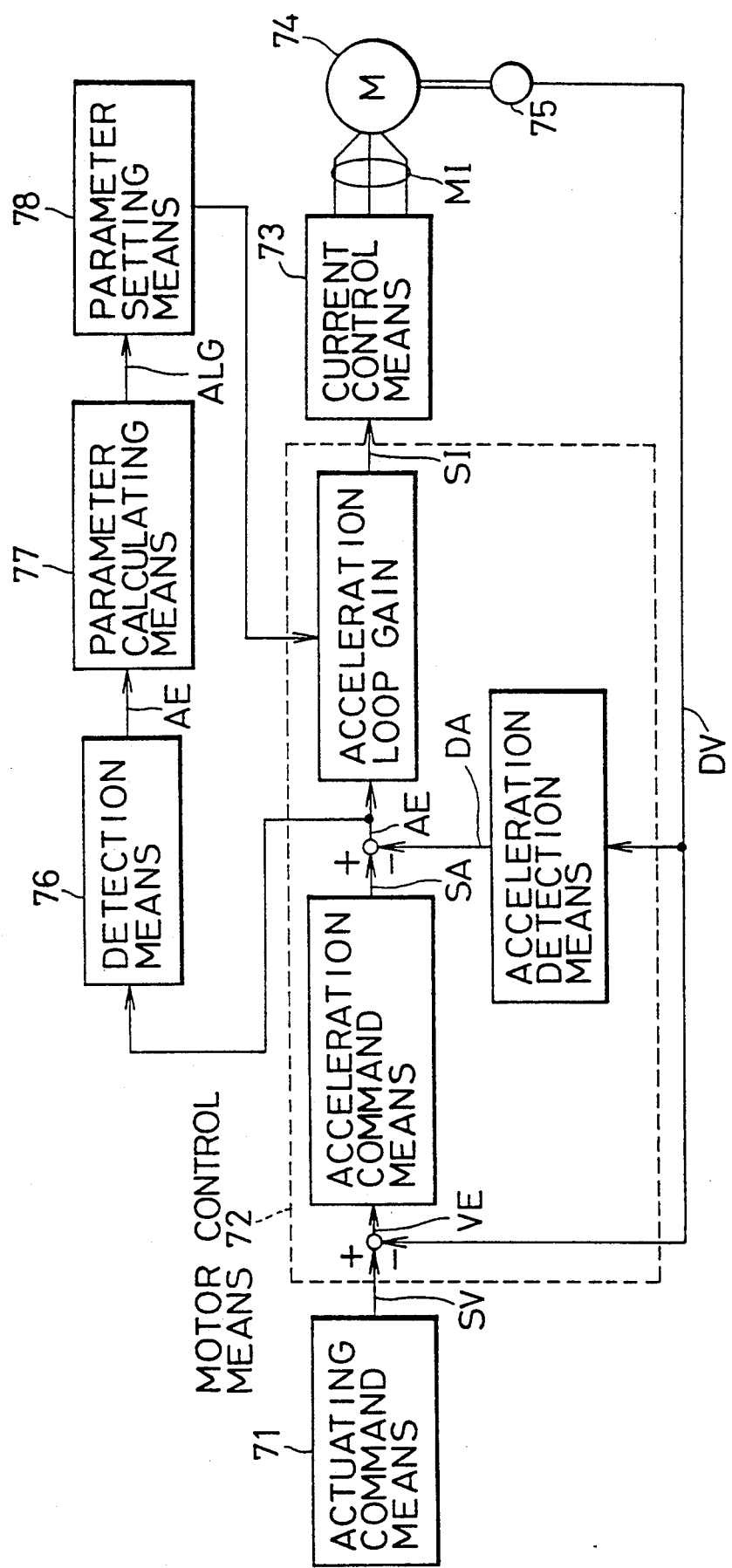
FIG. 12 is a block diagram of a ninth embodiment of a numerical control apparatus of the present invention having a function for changing the control parameters.

FIG. 12 is a block diagram of a ninth embodiment of a numerical control apparatus of the present invention having a function for changing the control parameters. An actuating command means 71 sends a speed command SV to a motor control means 72. A speed detector 75, which is mechanically connected to a motor 74, detects the speed of the motor 74 and sends a speed detection value DV to a motor control means 72. From the speed command SV and the speed detection value DV, the motor control means 72 calculates a speed error VE, and based on the speed error VE, calculates an acceleration command SA. From detection acceleration DA, an acceleration error AE is obtained by differentiating the acceleration command SA and the speed detection value DV. The motor control means 72 calculates a current command SI by using the acceleration error AE and the acceleration loop gain ALG and sends it to a current control means 73. Based on the current command SI, the current control means 73 calculates a drive current MI and drives the motor 74, whereupon a detection means 76 detects the acceleration error AE. Next, a parameter calculating means 77 calculates the acceleration loop gain ALG based on the acceleration error AE. For example, it makes the acceleration loop gain ALG large only when the acceleration error AE is large. The parameter setting means 78 sets the acceleration loop gain ALG in the motor control means 72. As a result, a response delay in the transient time is reduced, and a stable operation can be achieved in a stationary state.

Figure 13:
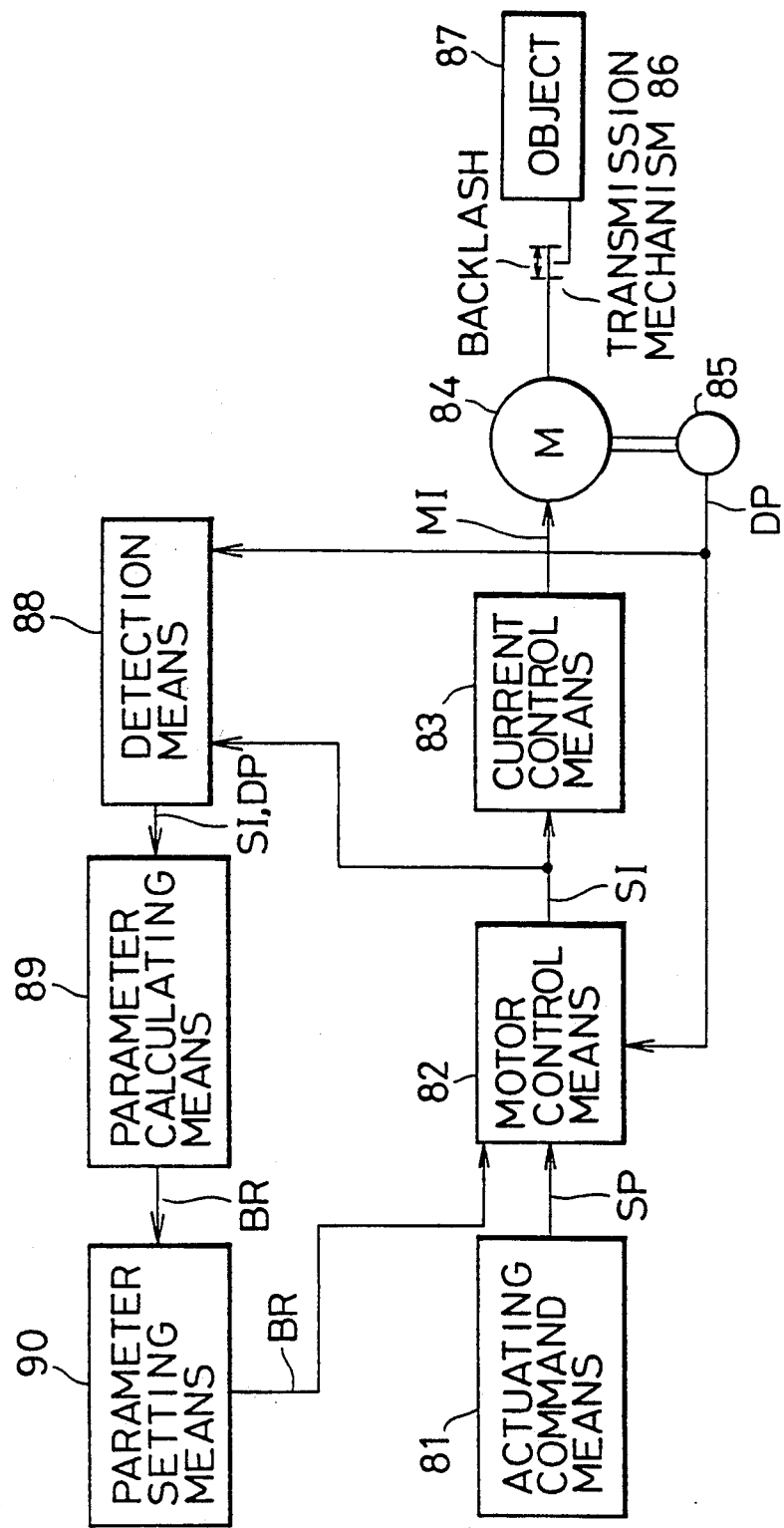
FIG. 13 is a block diagram of a tenth embodiment of a numerical control apparatus of the present invention having a function for changing the control parameters.
Figure 14:
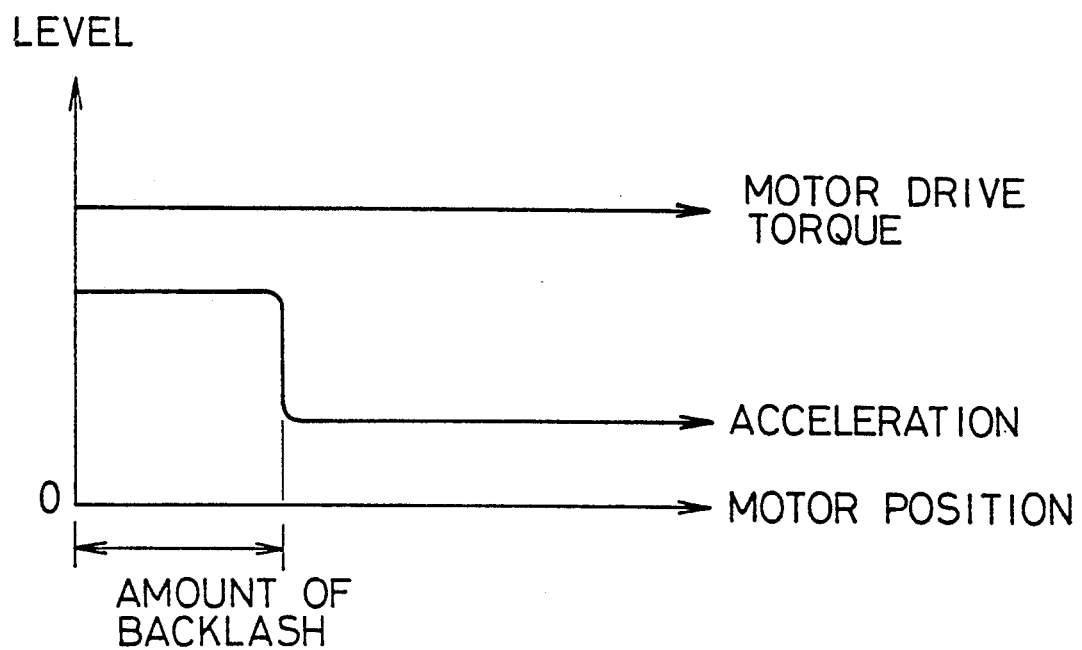
FIG. 14 is a graph showing the relationship between motor position, motor drive torque and acceleration of an apparatus of the present invention.

FIG. 13 is a block diagram of a tenth embodiment of a numerical control apparatus of the present invention having a function for changing the control parameters. An actuating command means 81 sends a position command SP to a motor control means 82. A position detector 85, which is mechanically connected to a motor 84, detects the position of the motor 84, and sends a position detection value DP to the motor control means 82. From the position command SP and the position detection value DP, the motor control means 82 calculates a current command SI. Based on the current command SI, a current control means 83 calculates a drive current MI and drives the motor 84. Next, an object 87 to be controlled is operated via a transmission mechanism 86, whereupon a detection means 88 detects the position detection value DP and the current command SI. Next, a parameter calculating means 89 obtains the speed by differentiating the position detection value DP, and also calculates the drive torque of the motor 84 from the current command SI by approximation, at the same time calculating the acceleration by differentiation. Now, the backlash can be obtained from the change in the motor drive torque and in the acceleration. As shown in FIG. 14, when the motor 84 is moving and at the same time there is the backlash, the acceleration per torque is high, and when the backlash is eliminated the acceleration per torque becomes low. The backlash amount BR is determined on the basis of the following two factors: a position at where the acceleration is changed, and a position at where the motor 84 starts to operate. Then, a parameter setting means 90 sets the backlash amount BR in the motor control means 82. As a result, the amount of the backlash is controlled automatically and a good positioning is performed.

Figure 15:
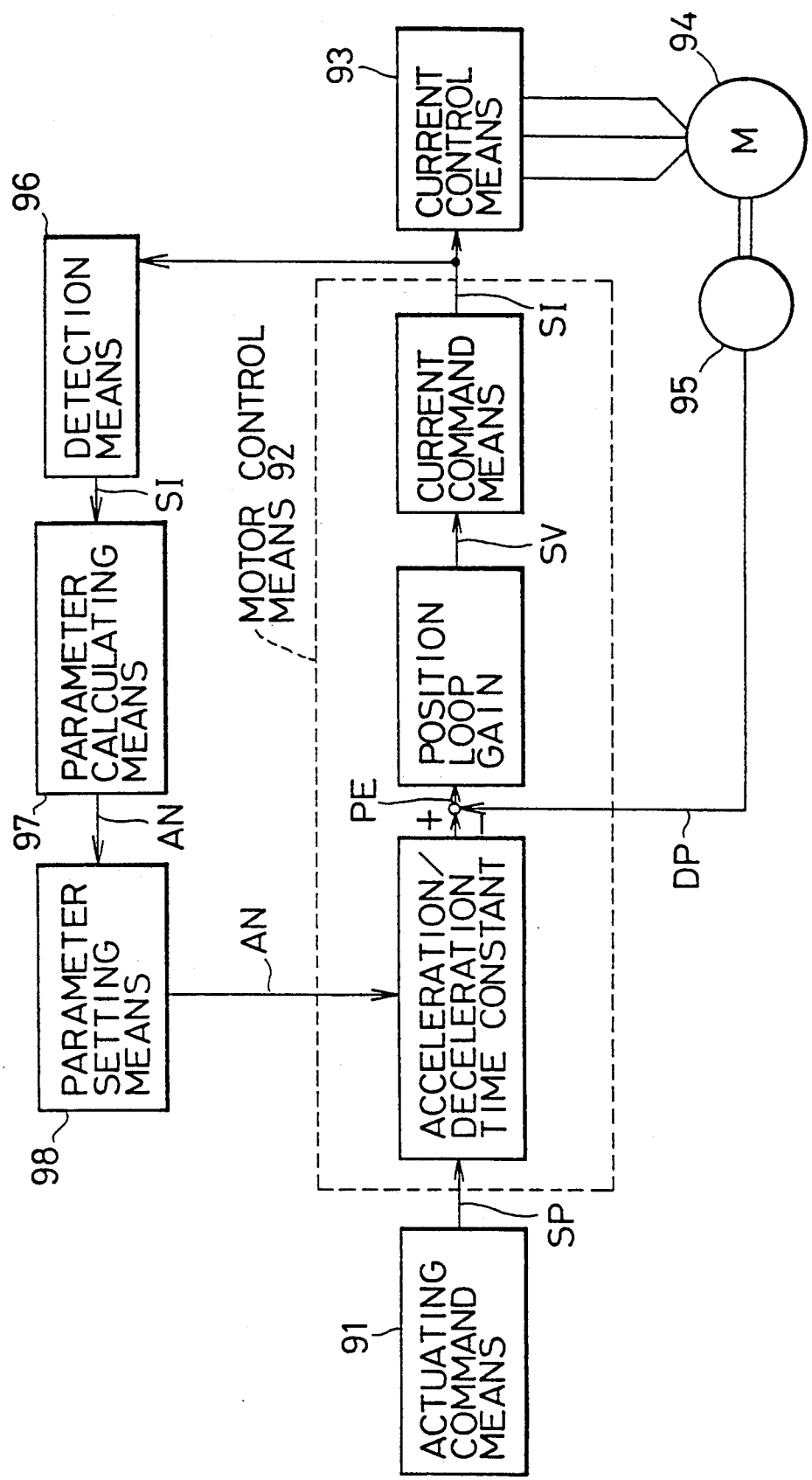
FIG. 15 is a block diagram of an eleventh embodiment of a numerical control apparatus of the present invention having a function for changing the control parameters.

FIG. 15 is a block diagram of an eleventh embodiment of a numerical control apparatus of the present invention having a function for changing the control parameters. An actuating command means 91 sends a position command SP to a motor control means 92. A position detector 95, which is mechanically connected to a motor 94, detects the position of the motor 94, and sends a position detection value DP to a motor control means 92. The motor control means 92 performs an acceleration/deceleration processing on the position command SP, and subtracts the position detection value DP from the result of the above processing so as to determine a position error PE. Further, the motor control means 92 calculates a speed command SV by multiplying the position error PE with a position loop gain PLG, and calculates a current command SI in accordance with the speed command SV and sends it to a current control means 93. Based on the current command SI, the current control means 93 generates currents and drives the motor 94. A time constant is decided by the motor control means 92 such that a load can be accelerated by the limited motor output torque, but there are cases where a motor output torque is saturated due to the changing of load inertia and so on. When this occurs, the speed error, the position error or the like increase, and therefore machining precision cannot be maintained. In this connection, a detection means 96 detects the saturation of the motor output torque according to the current command value SI received by the current control means 93. In case of the saturation of the motor output torque, the parameter calculating means 97 makes an acceleration/deceleration time constant AN longer. A parameter setting means 98 sets the acceleration/deceleration time constant AN in the motor control means 92. As a result, even in a state of overload, a stable control with reduced path error can be achieved.

Figure 16:
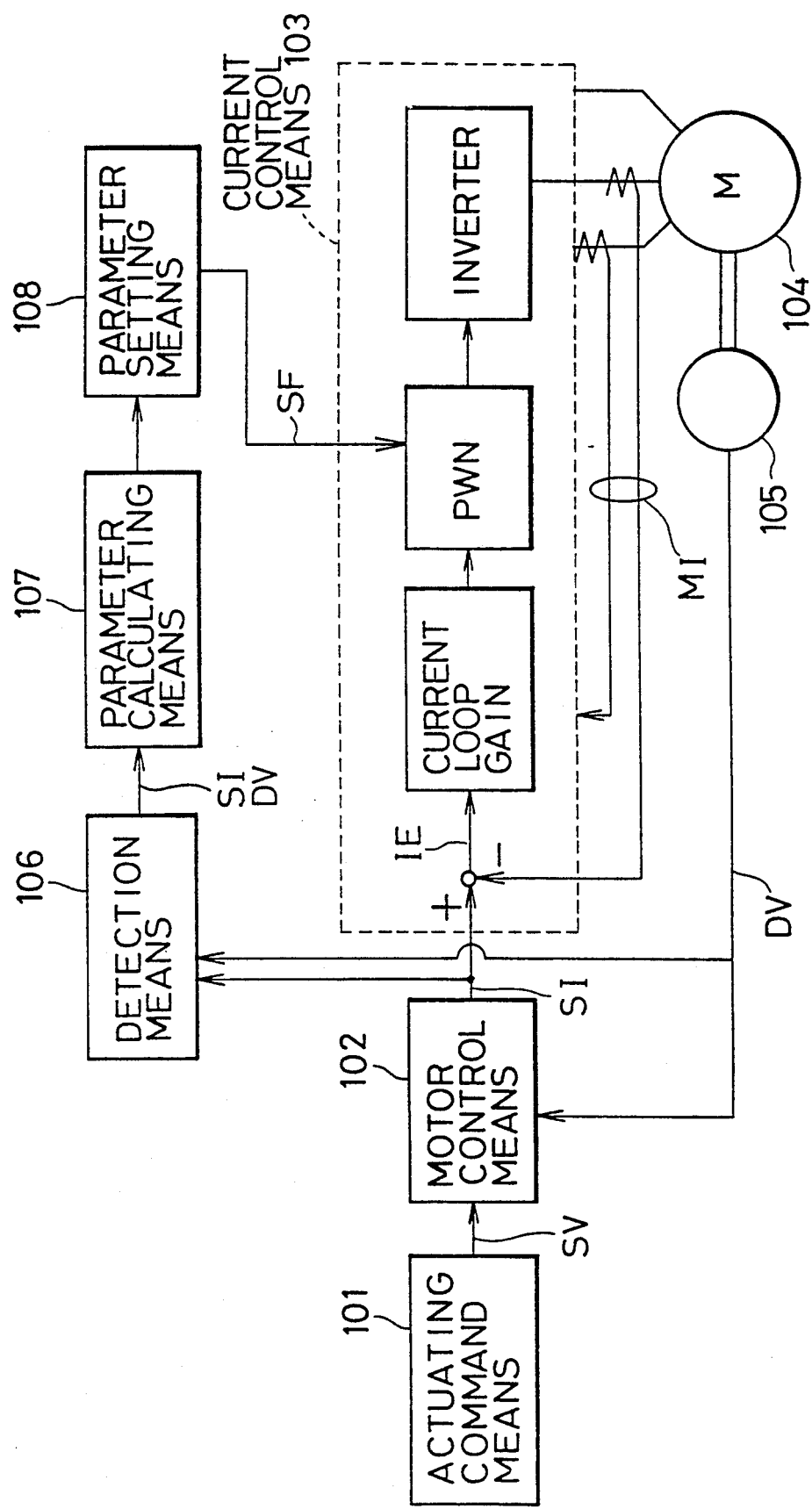
FIG. 16 is a block diagram of a twelfth embodiment of a numerical control apparatus of the present invention having a function for changing the control parameters.

FIG. 16 is a block diagram of a twelfth embodiment of a numerical control apparatus of the present invention having a function for changing the control parameters. In this figure only one phase is shown. An actuating command means 101 sends a speed command SV to a motor control means 102. A speed detector 105, which is mechanically connected to a motor 104, detects the speed of the motor 104, and sends a speed detection value DV to the motor control means 102. From the speed command SV and the speed detection value DV, the motor control means 102 calculates a speed error VE. The motor control means 102 calculates a current command SI based on the speed error VE and sends it to a current control means 103. From the current command SI and a motor drive current value MI, the current control means 103 calculates a current error IE, and drives the inverter through a PWM (Pulse Width Modulator) based on the current error IE and a current loop gain ILG, thus sending the motor drive current MI, which drives the motor 104. A detection means 106 detects the current command SI and the speed detection value DV. Next, a parameter calculating means 107 calculates the load state by using the current command SI and the speed detection value DV. For example, if the numeral "Kt" is the torque constant of the motor 104, "Ia" the current command, "V" the speed detection value, "D" the viscous damping coefficient of the load, "F" the frictional force, "L" the resistance to machining and "J" the load inertia, then, the following equation (4) is established.

$$Kt \times Ia = J \times (dV/dt) + D \times V + F + L \qquad (4)$$

Therefore, the machining resistance L can be calculated if the torque constant Kt, the load inertia J, the viscous damping coefficient D, and the frictional force F are obtained beforehand. Thus, when the machining resistance L is extremely small, that is, when the machining is not being performed, a reduction in noise pollution is achieved by changing the sampling frequency of the PWM in the current control means 103 so as to avoid humanly audible frequencies. Further, when the machining resistance L is large, that is to say, when a heavy load cutting is being done, a responsibility for the current is increased by raising the sampling frequency of the PWM in the current control means 103, and thus control performance is improved. A parameter setting means 108 sets the sampling frequency SF of the PWM in the current control means 103. As a result, even in a control state in low noise pollution, a good responsibility can be achieved.

Figure 17:
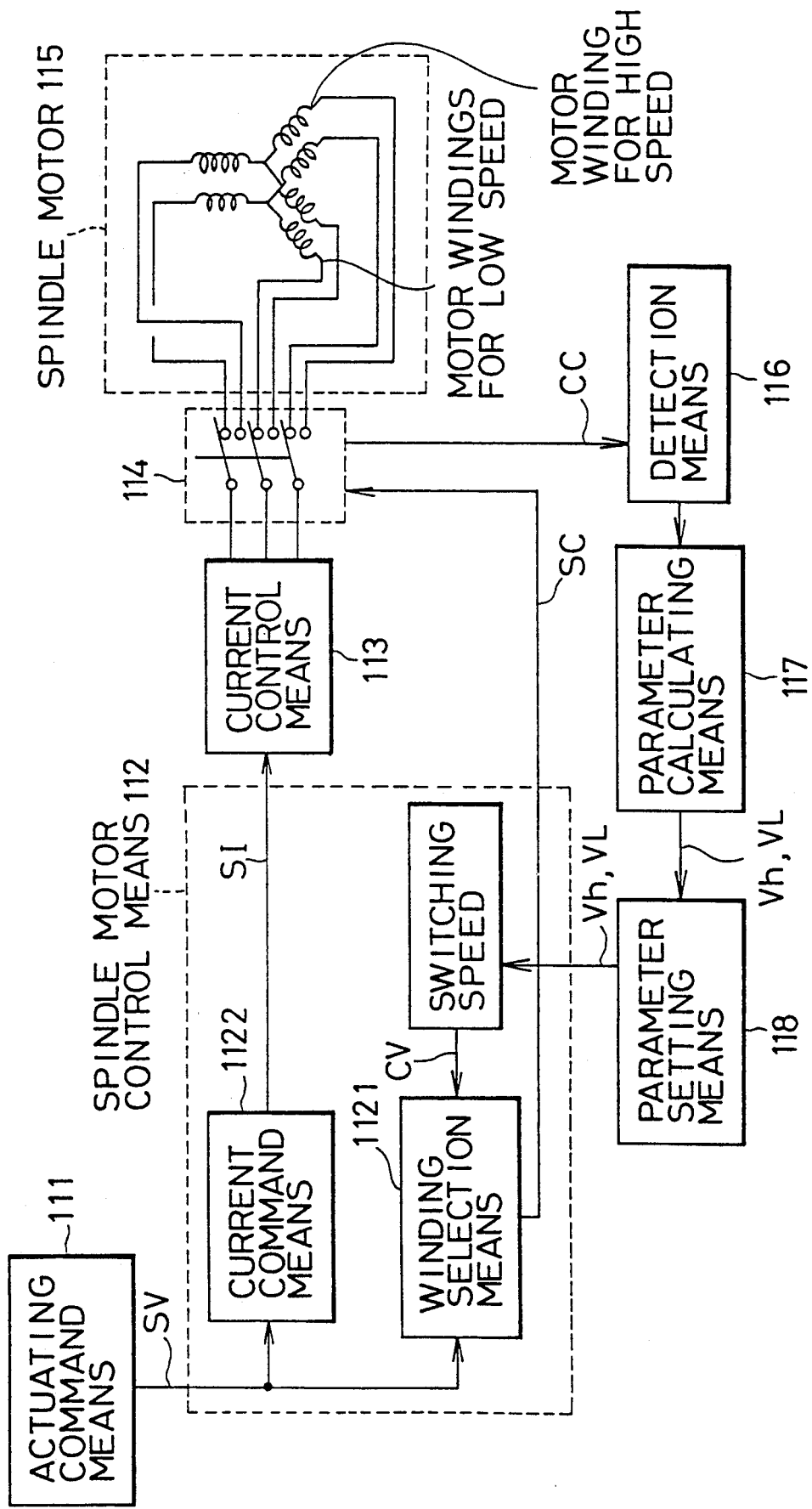
FIG. 17 is a block diagram of a thirteenth embodiment of a numerical control apparatus of the present invention having a function for changing the control parameters.
Figure 18:
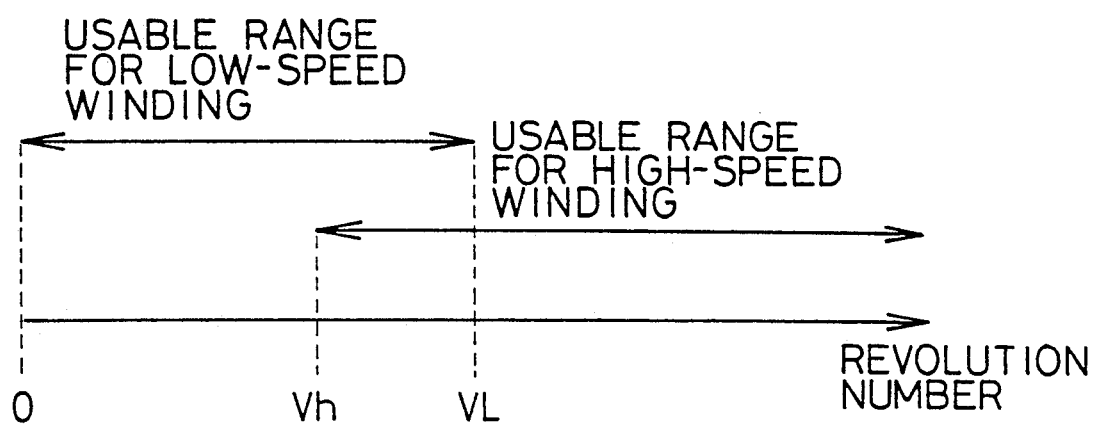
FIG. 18 shows the relationship between speed and usable range for winding in the apparatus of the present invention shown in FIG. 17.

FIG. 17 is a block diagram of a thirteenth embodiment of a numerical control apparatus of the present invention having a function for changing the control parameters. An actuating command means 111 sends a speed command SV to a spindle motor control means 112. The spindle motor control means 112, after inputting the speed command SV, first selects windings of a spindle motor 115 by using a winding selection means 1121, and then sends a switching signal SC to a magnetic switch 114 so as to switch windings of the spindle motor 115. Next, a current command means 1122 calculates a current command SI based on the speed command SV, and sends it to a current control means 113. Based on this operation, the current control means 113 generates currents and drives the spindle motor 115 which have motor windings for low speed and motor windings for high speed. Generally, a certain switching speed CV is fixed as a limit for switching the motor windings, and if the speed command SV exceeds the switching speed CV by even a little, the switching operation for the motor windings will happen. However, as the winding switching takes several hundreds of milliseconds, if the amount by which the speed command SV exceeds the switching speed CV is small, total operation time may be made longer, rather than shorter, by the winding switching occurring. Assume that the motor has switchable windings for two speeds, or high speed and low speed, and that the lower limit value for usability at a high speed is "Vh", and the upper limit value for usability at a low speed is "VL". Usually, the equation "Vh≦VL" is obtained and there is an overlap portion as shown in FIG. 18. Assume that the speed command value is "Vc". Then, in a case where Vh≦Vc≦VL, i.e. when the speed is such that either windings can be used, it is better in order to save the time, that switching not be performed. In this connection, a detection means 116 detects a switching state CC of the windings. Next, if the switching state of the windings is high speed, a parameter calculating means 117 gives the lower limit value Vh as the switching speed, and if the switching state of the windings is low speed, gives the upper limit value VL as the switching speed to a parameter setting means 118, which sets the switching speed in the spindle motor control means 112. The lower limit value Vh and the upper limit value VL may be determined beforehand by experiments. As a result, a saving of the machining time can be achieved.

Figure 19:
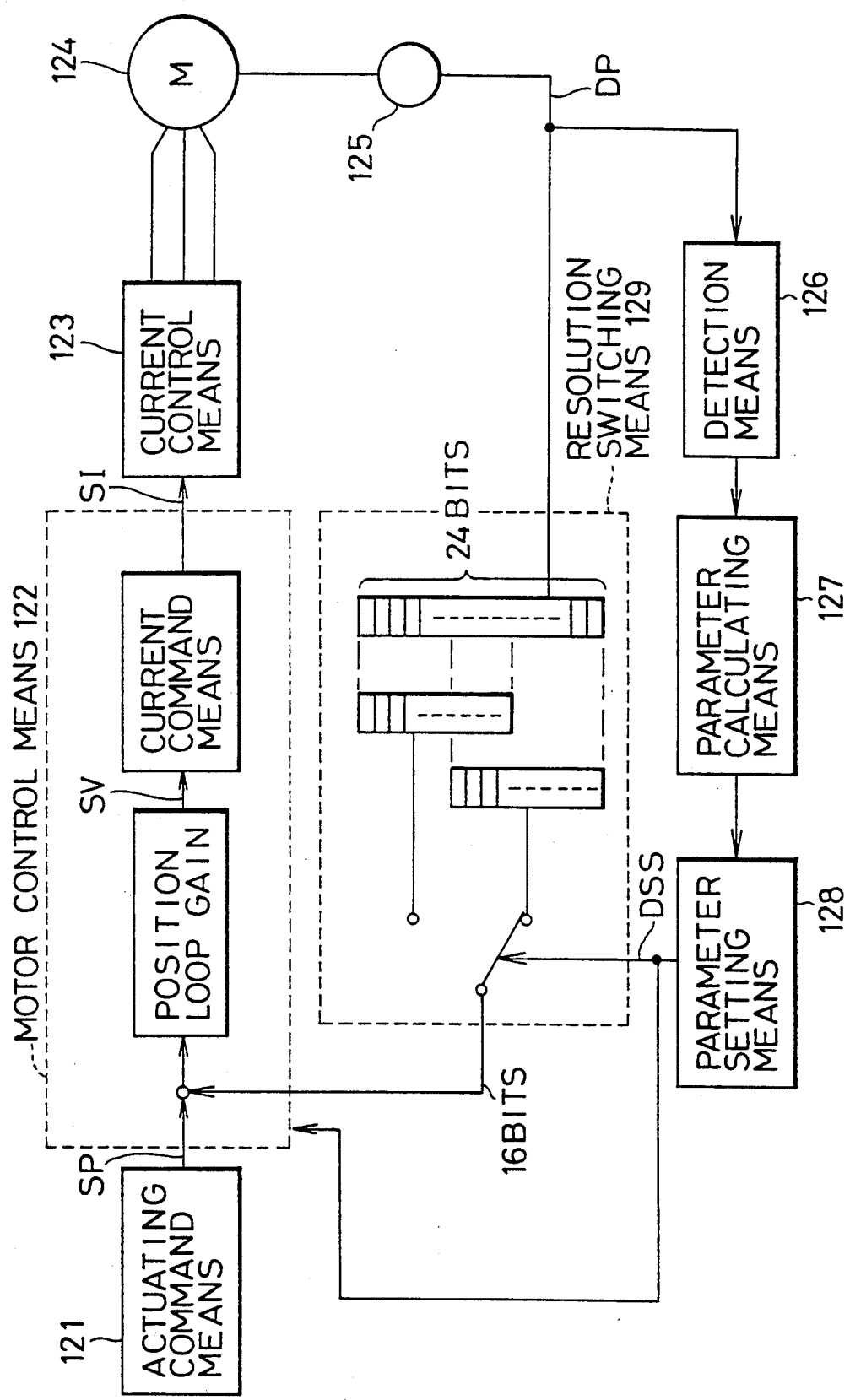
FIG. 19 is a block diagram of a fourteenth embodiment of a numerical control apparatus of the present invention having a function for changing the control parameters.

FIG. 19 is a block diagram of a fourteenth embodiment of a numerical control apparatus of the present invention having a function for changing the control parameters. An actuating command means 121 sends a position command SP to a motor control means 122. A position detector 125, which is mechanically connected to a motor 124, detects the position of the motor 124, and sends a position detection value DP to the motor control means 122. From the position command SP and the position detection value DP, the motor control means 122 calculates a position error PE, which it multiples by a position loop gain PLG to obtain a speed command SV. The motor control means 122 calculates a current command SI based on the speed command SV and sends it to a current control means 123. In response, the current control means 123 generates currents and drives the motor 124. In general, in order to make compatible a fine position control and a high-speed operation, the position detector 125 and other processing systems are required to have a wide dynamic range, and as a result, the manufacturing cost is higher and the time taken for the detection is increased. For example, we assume that the resolution required for the position detector 125 is 24 bits. In general, a position detector 125's interface and the processing system thereof each have a range of 24 bits. Now, if the 24-bits data are divided into the top 16 bits (refer to "upper data" hereinafter) and the bottom 16 bits (refer to "lower data" hereinafter), then when the speed is low, i.e. in a positioning state, the high-resolution lower data is used as the position detection value, and thus positioning performance is maintained. When the speed is high, the upper data is used as the position detection value and it is thus possible to adapt to the high-speed control. Thus, even with a 16-bit detector interface, it is possible to obtain the same level of control capability as with a 24-bit one. In concrete detail, a detection means 126 detects the position detection value DP. Then, a parameter calculating means 127 differentiates the position detection value DP to obtain a speed and selects the resolution of the position detection value DP based on the speed. When the speed is low, i.e. in the positioning state, the lower data is used, and when the speed is high the upper data is used. Next, a parameter setting means 128 sends a resolution selection signal DSS to the motor control means 122 and a resolution switching means 129. The resolution switching means 129 selects either the upper data or the lower data, and sends the selected data as a position detection value to the motor control means 122, which knows by means of the resolution selection signal DSS whether it is the upper data or the lower data and thus can process the positioning accordingly. As a result, the above-described problem can be solved without increasing the dynamic range of the position detector's interface or the processing system, and a reduction in cost can be expected.

Figure 20:
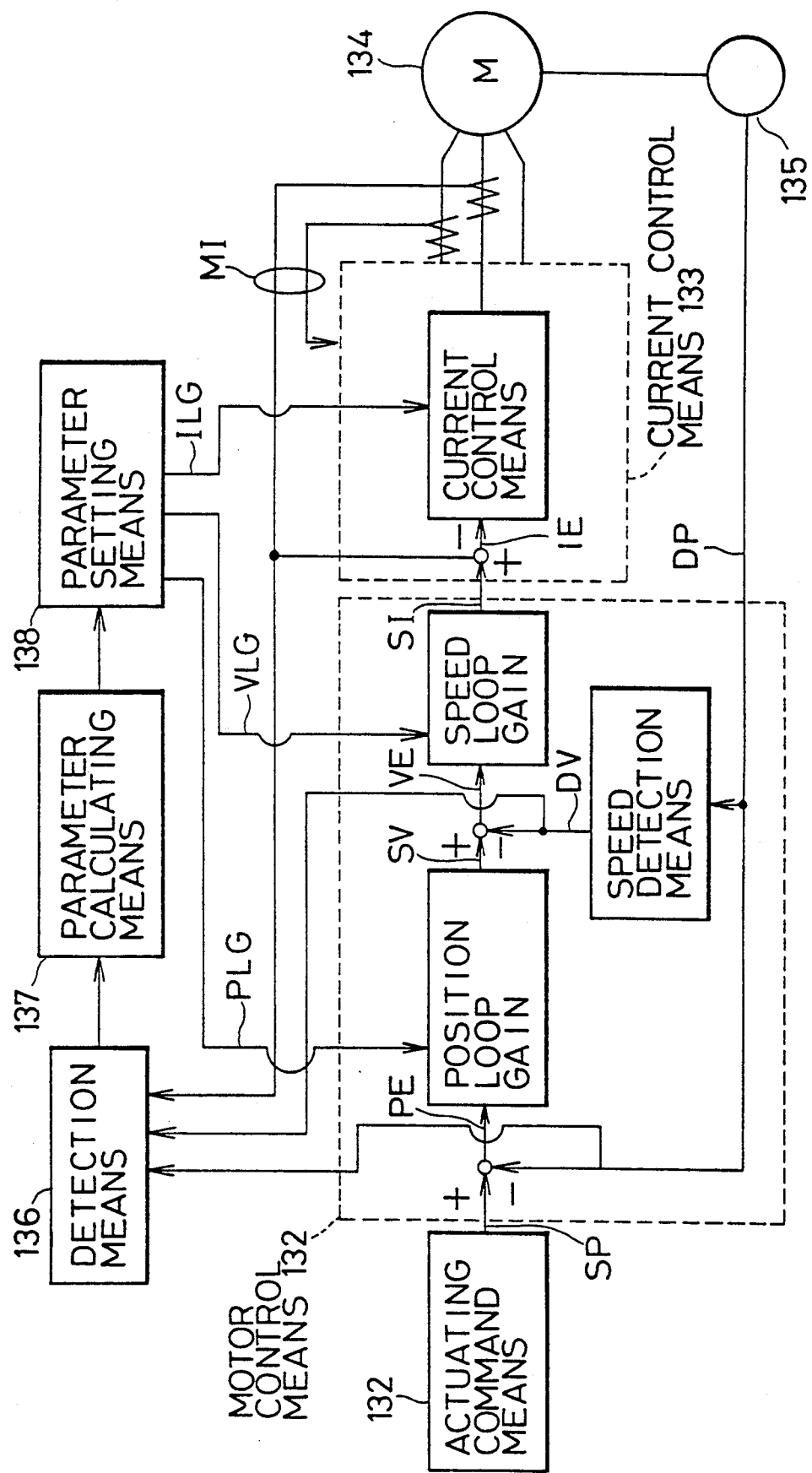
FIG. 20 is a block diagram of a fifteenth embodiment of a numerical control apparatus of the present invention having a function for changing the control parameters.

FIG. 20 is a block diagram of a fifteenth embodiment of a numerical control apparatus of the present invention having a function for changing the control parameters. An actuating command means 131 sends a position command SP to a motor control means 132. A position detector 135, which is mechanically connected to a motor 134, detects the position of the motor 134, and sends a position detection value DP to the motor control means 132. From the position command SP and the position detection value DP, the motor control means 132 calculates a position error PE and multiplies it with a position loop gain PLG to calculate a current command SV. The motor control means 132 further calculates the speed detection value DV by differentiating the speed error SE and the position detection value DP, calculates a speed error VE based on the speed detection value DV, and obtains a current command SI by multiplying the speed error VE by a speed loop gain VLG and sends it to a current control means 133. The current control means 133 calculates a current error IE from the current command SI and a motor drive current value MI, and calculates the motor drive current MI based on the current error IE and the current loop gain ILG and sends it to the motor 134. A detection means 136 detects the motor drive current value MI, the position detection value DP and the speed detection value DV. Then, the parameter calculating means 137 detects a collision of the moving parts from the above values. If there is any collisions, the parameter calculating means 137 calculates a value which is zero or which will stop the operation for the position loop gain PLG, the speed loop gain VLG and the current loop gain ILG. A parameter setting means 138 sets the above calculated value in the motor control means 132 and the current control means 133. As a result, even if a collision occurs, stopping of the operation is achieved without delay, and thus damages can be reduced to the minimum.

Figure 21:
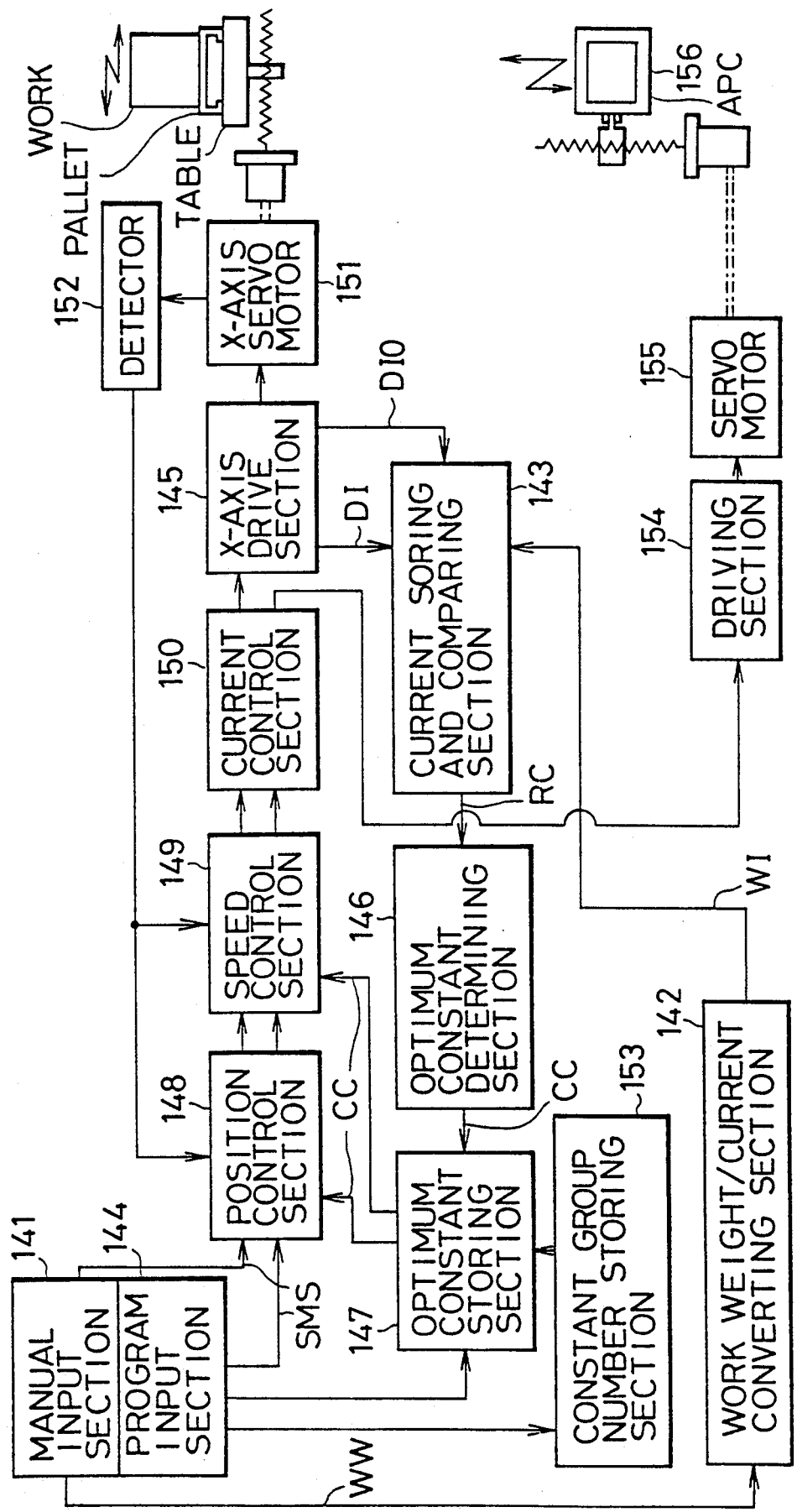
FIG. 21 is a block diagram of a sixteenth embodiment of a numerical control apparatus of the present invention having a function for changing the control parameters.
Figure 22A:
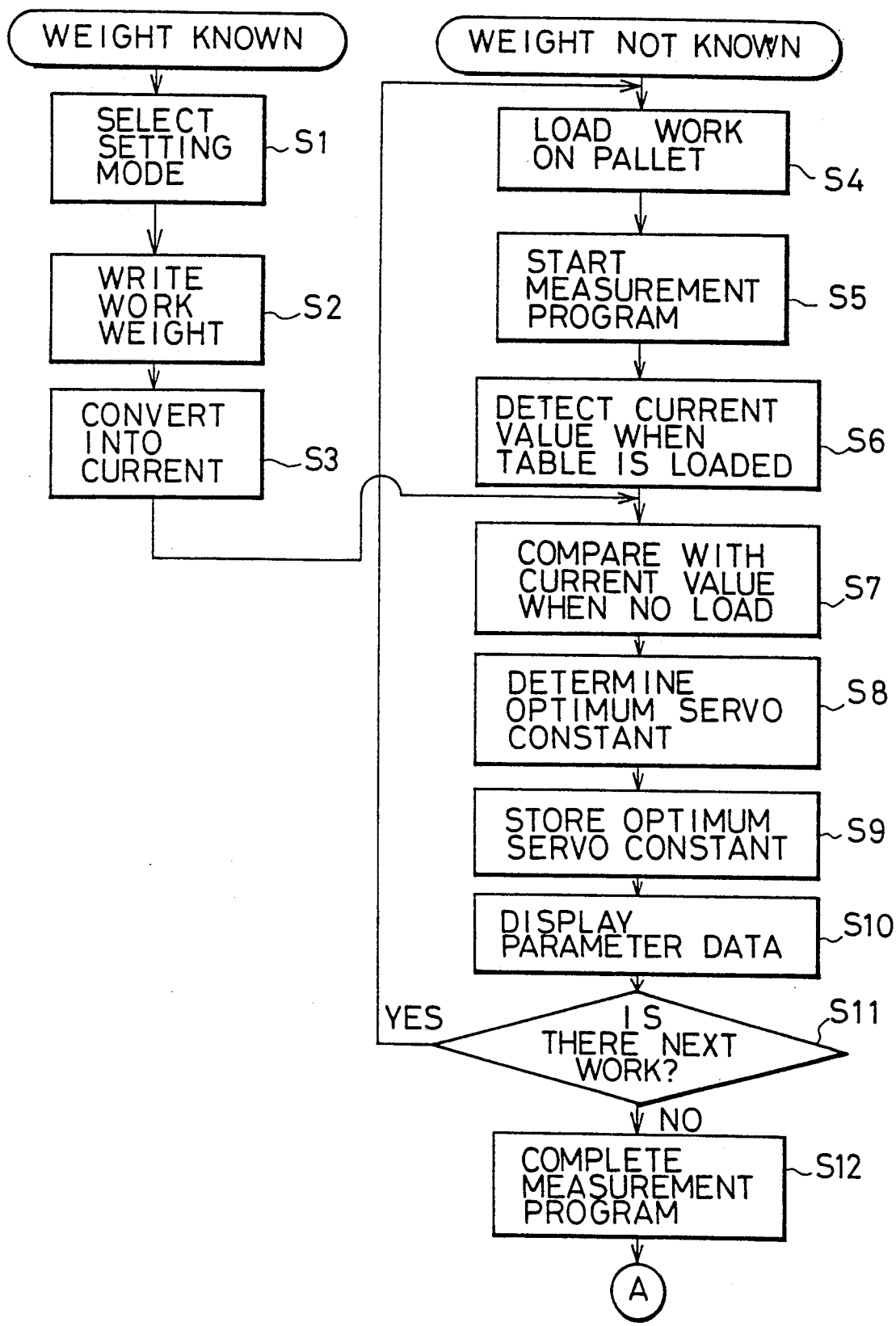
FIGS. 22A and 22B are flowcharts explaining an example of the operation of the apparatus of the present invention shown in FIG. 21.
Figure 22B:
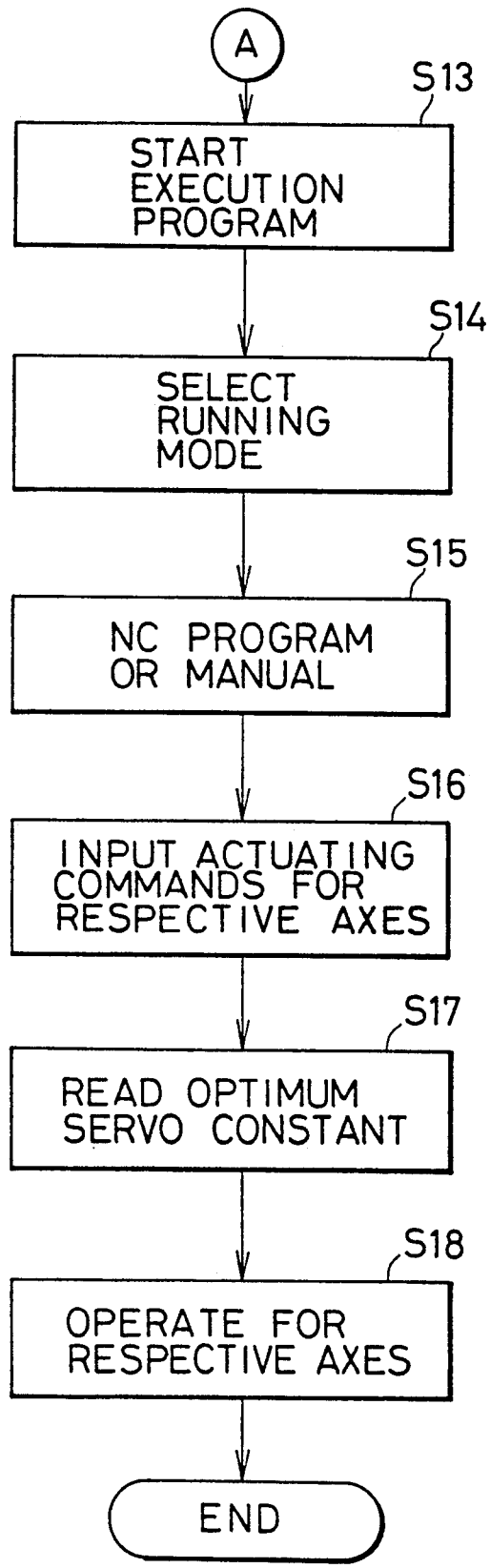

FIG. 21 is a block diagram of a sixteenth embodiment of a numerical control apparatus of the present invention having a function for changing the control parameters. FIGS. 22A and 22B are flowcharts explaining the operation thereof. In cases where the weight of a work loaded on a table of the machine is already known, an operator selects a setting mode by means of a manual input section 141 (Step S1), and writes a work weight WW in a work weight/current converting section 142 (Step S2). Work weight/current converting section 142 converts the work weight WW into the current (Step S3), and the current value WI is stored in a current storing and comparing section 143 and then the proceeding is skipped to the Step S7. If, on the other hand, the weight of the work loaded on the pallet on the table of the machine is not known, the measurement program is started by using the manual input section 141 (Step S4 and Step S5). An X-axis drive section 145 detects the current value when the table is loaded (Step S6), and stores the current value DI in the current storing and comparing section 143. The current storing and comparing section 143 compares a current DIO, which is the current already detected in the X-axis drive section 145 when there is nothing loaded on the table, with the converted current value WI from the work weight/current converting section 142 or the detection current value DI from the X-axis drive section 145 (Step S7). An optimum constant determining section 146 determines the optimum servo constant CC on the basis of the comparison result RC from the current storing and comparing section 143 and stores it in an optimum constant storing section 147 (Step S8 and Step S9), and displays the optimum servo constant CC on a display device (not shown) (Step S10). Then, the presence or absence of a next work is checked (Step S11), and if there is a next work, then the proceeding is returned to the Step S4 and the above-described operations are repeated. If there is no further work, the measurement program is completed and an execution program is started (Step S12 and Step S13). The operator selects a running mode by means of the manual input section 141 (Step S14), and inputs actuating commands SMS for the respective axes from the manual input section 141 or a program input section 144 (Step S15 and Step S16). Then, a position control section 148 and a speed control section 149 receive the each axis's actuating commands and read the optimum servo constant CC from the optimum constant storing section 147, and control each axis's operations via a current control means 150 (Step S17 and Step S18), thus completing the whole process.

Since, as described above, by using a numerical control apparatus of the present invention, it is possible to maintain an optimum control state for any machining state and environment, a loss-free high-efficiency machining is possible, and therefore remarkable reductions in the number of production steps can be expected.

It should be understood that many modifications and adaptations of the invention will become apparent to those skilled in the art and it is intended to encompass such obvious modifications and changes in the scope of the claims appended hereto.

What is claimed is:
1. A numerical control apparatus for controlling feed shafts and a spindle of a machine tool, the numerical control apparatus comprising:
   a motor having windings for high speed and low speed;
   a switching means for switching the windings;
   a current command means for outputting a current command;
   a current control means for receiving the current command and for outputting current for the motor through the switching means;
   a winding selection means for switching the switching means;
   a detection means for detecting a switching state of the switching means;
   a parameter calculating means for calculating a switching speed according to the switching state; and
   a parameter setting means for setting the switching speed in the winding selection means.
2. A numerical control apparatus for controlling feed shafts and a spindle of a machine tool, the numerical control apparatus comprising:
   a detecting means for detecting the control state of the feed shafts and the spindle;
   a calculating means for calculating control parameters based on the detected operating state of the feed shafts and the spindle; and
   a setting means for setting the calculated control parameters, thereby changing the control parameters in response to the operating state of the feed shafts and the spindle;
   wherein the numerical control apparatus further comprises for one axis:
   a motor;
   a position detector connected to said motor;
   a motor control means for receiving a position command and a detected position value and for output- ting a current command and a current control means for driving said motor according to the current command; and wherein said detecting means detects an acceleration Am and a torque T of said motor, and wherein said calculating means calculates a shortest acceleration/deceleration time Ta according to the following equations:

$$Ta \times S \times (Im + IW)/TM$$

and $$IW = T/Am - Im$$

wherein:

Im is an inertia of a rotor of said motor and S is a maximum speed of said motor and TM is a maximum output torque of said motor.

3. A numerical control apparatus for controlling feed shafts and a spindle of a machine tool, the numerical control apparatus comprising:

a detecting means for detecting the control state of the feed shafts and the spindle;

a calculating means for calculating control parameters based on the detected operating state of the feed shafts and the spindle; and a setting means for setting the calculated control parameters, thereby changing the control parameters in response to the operating state of the feed shafts and the spindle;

wherein the numerical control apparatus further comprises, for one axis:

a motor;

a position detector connected to said motor;

a motor control means for receiving a position command and a detected position value and for outputting a current command and a current control means for driving said motor according to the current command;

and wherein said detecting means detects a saturation of motor output torque in accordance with the current command, and wherein said calculating means calculates an acceleration/deceleration time constant based on the saturation of the motor output torque and said setting means sets the acceleration/deceleration time constant in said motor control means, whereby said motor control means calculates a position error from the detected position error and a position signal obtained by multiplying the position command by the acceleration/deceleration time constant, and calculates a speed command by multiplying the position error by a position loop gain and outputs the current command in accordance with the speed command.

4. A numerical control apparatus for controlling feed shafts and a spindle of a machine tool, the numerical control apparatus comprising:

a detecting means for detecting the control state of the feed shafts and the spindle;

a calculating means for calculating control parameters based on the detected operating state of the feed shafts and the spindle; and a setting means for setting the calculated control parameters, thereby changing the control parameters in response to the operating state of the feed shafts and the spindle;

wherein the numerical control apparatus further comprises, for one axis:

a motor;

a speed detector connected to said motor;

a motor control means for receiving a speed command and a detected speed value and for outputting a current command and a current control means for driving said motor through a PWM type inverter according to the current command;

and wherein said detecting means detects the speed command and the detected speed value, and said calculating means detects a state of a load and calculates a sapling frequency for the PWM type inverter due to the states and said setting means sets the sampling frequency in the current control means, whereby said current control means obtains a current error from the speed command and a motor drive current outputted from the PWM type inverter and inputs a signal obtained by multiplying the current error by a current loop gain to the PWM type inverter.

* * * * *